Nov. 5, 1968     W. C. AHRNS     3,409,293
TABULATING CARD READER INPUT HOPPER FEED STRUCTURE
Filed Feb. 11, 1965     14 Sheets-Sheet 1
FIG. 1
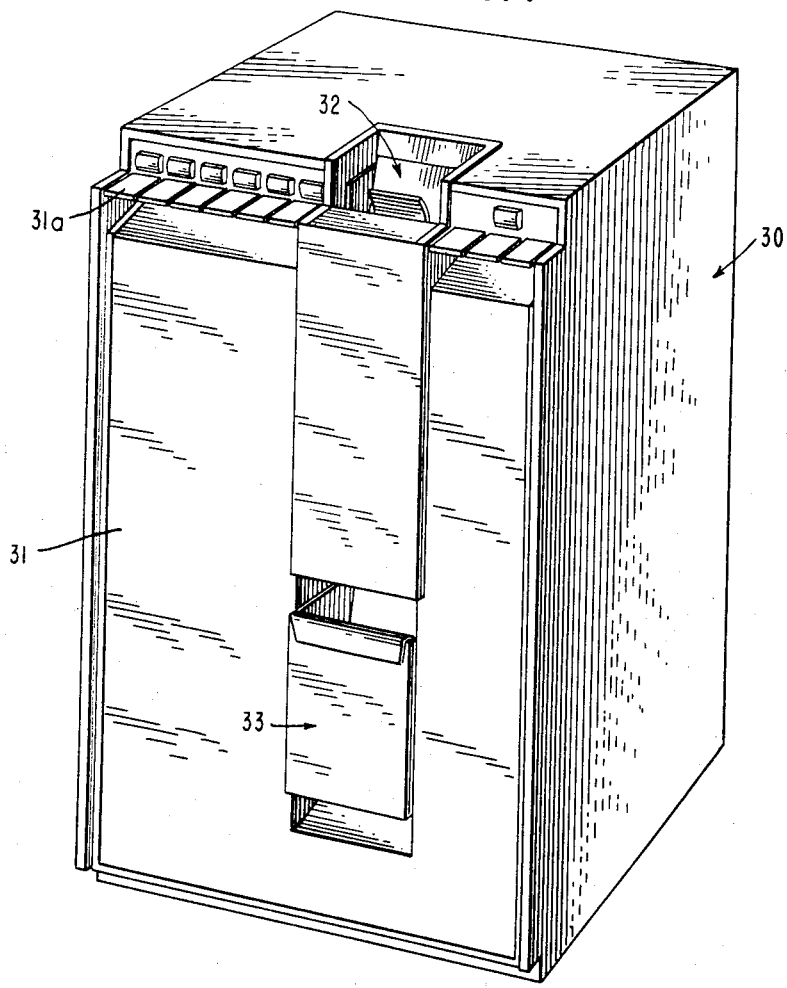
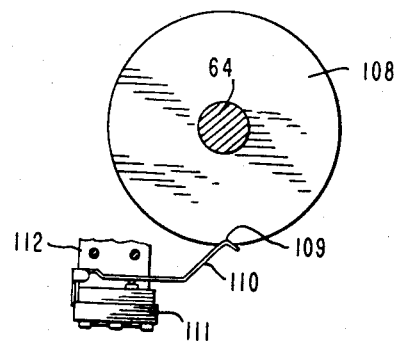
FIG. 22
INVENTOR.
WILBUR C. AHRNS
BY John A. Harvey
ATTORNEY

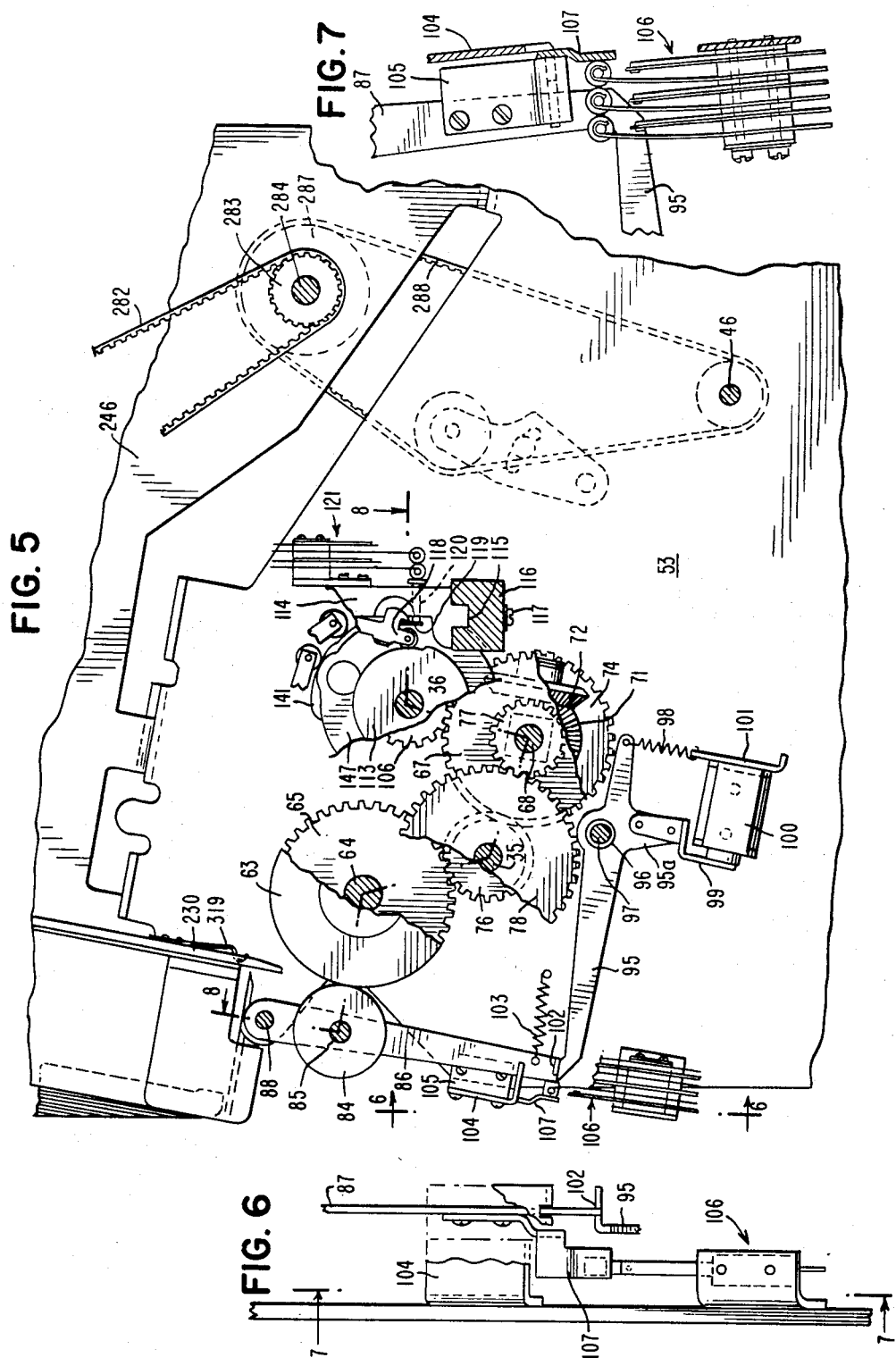

Nov. 5, 1968  W. C. AHRNS  3,409,293
TABULATING CARD READER INPUT HOPPER FEED STRUCTURE
Filed Feb. 11, 1965  14 Sheets-Sheet 6
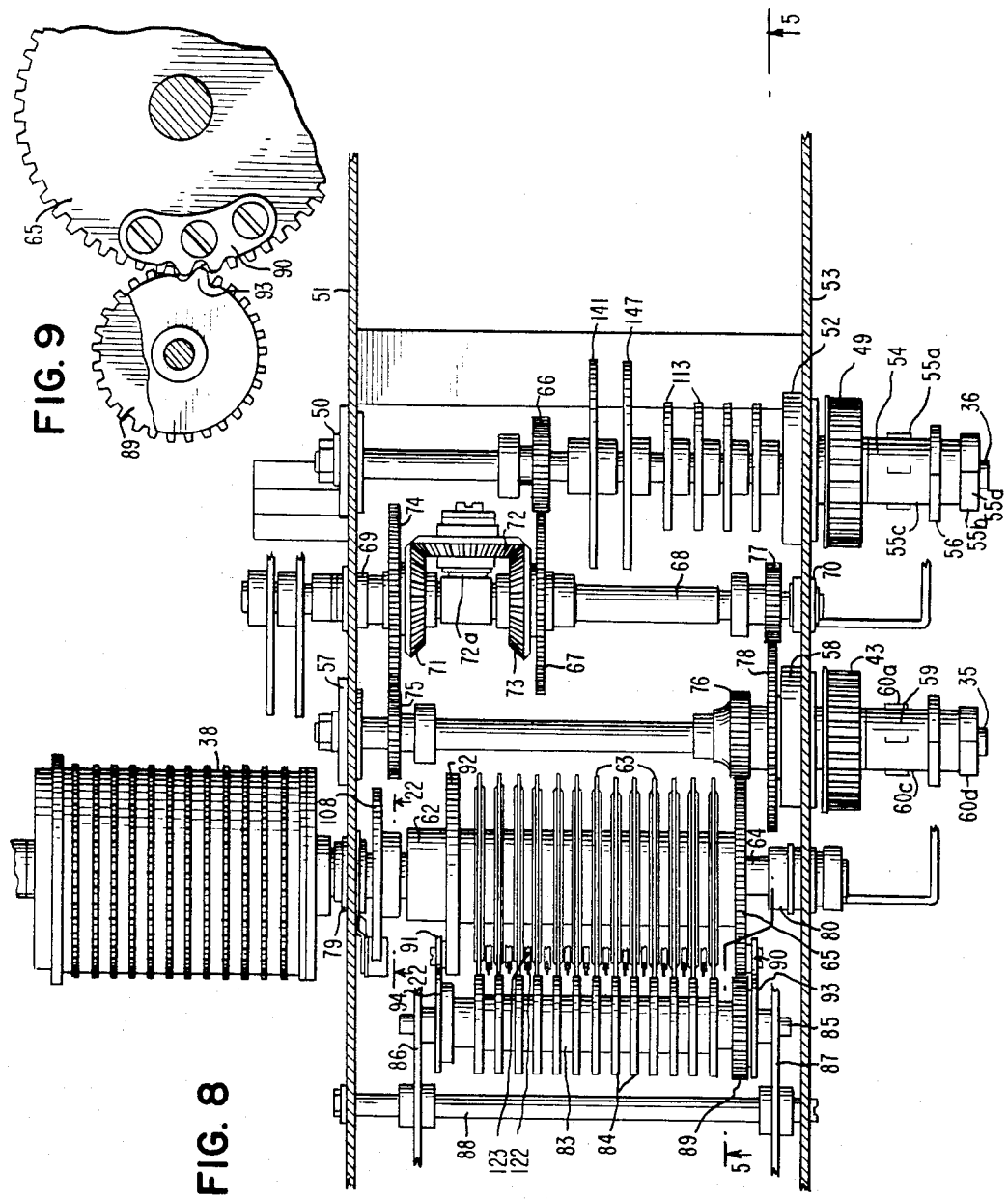

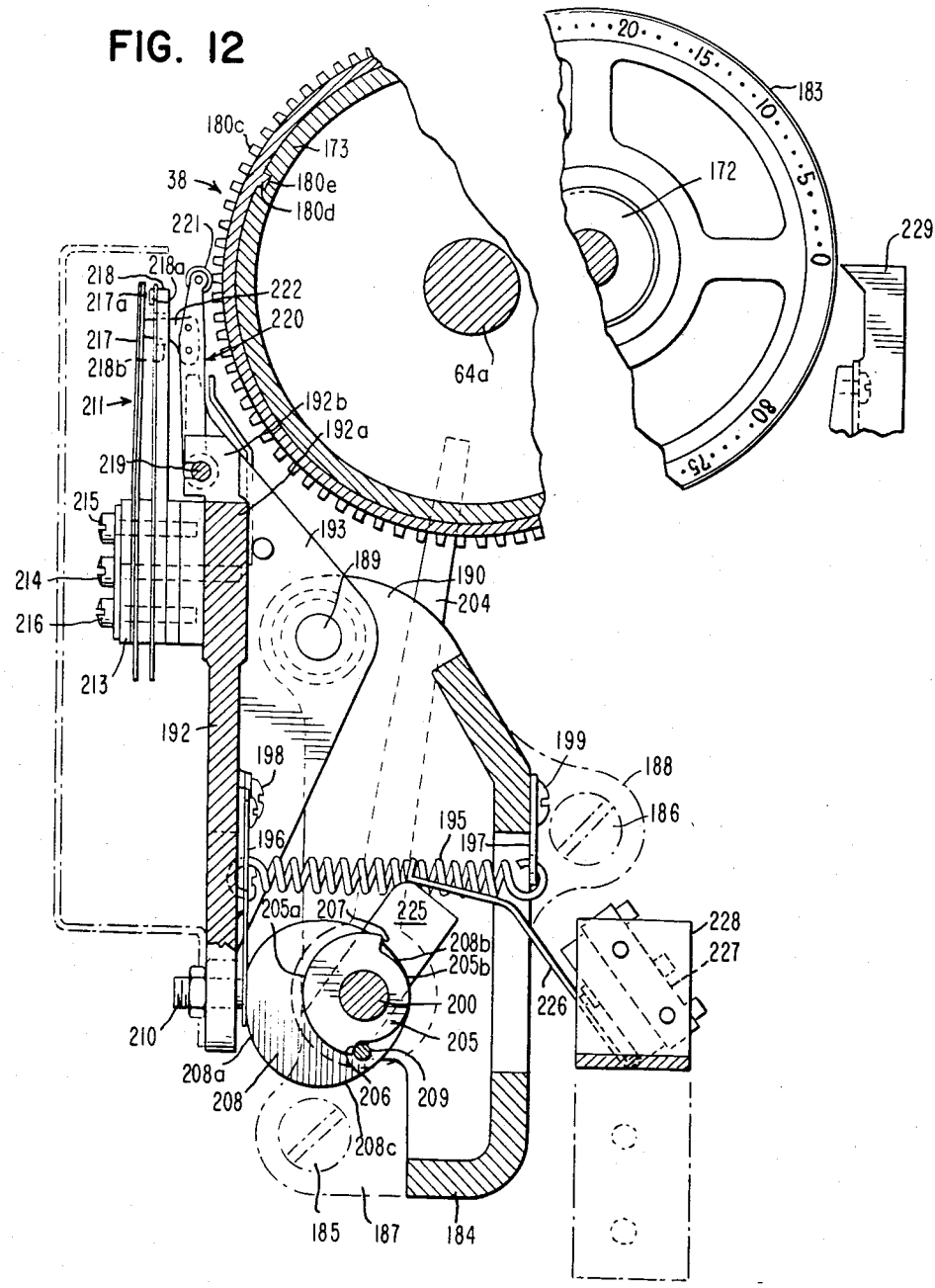

Nov. 5, 1968   W. C. AHRNS   3,409,293
TABULATING CARD READER INPUT HOPPER FEED STRUCTURE
Filed Feb. 11, 1965   14 Sheets-Sheet 10

FIG. 16
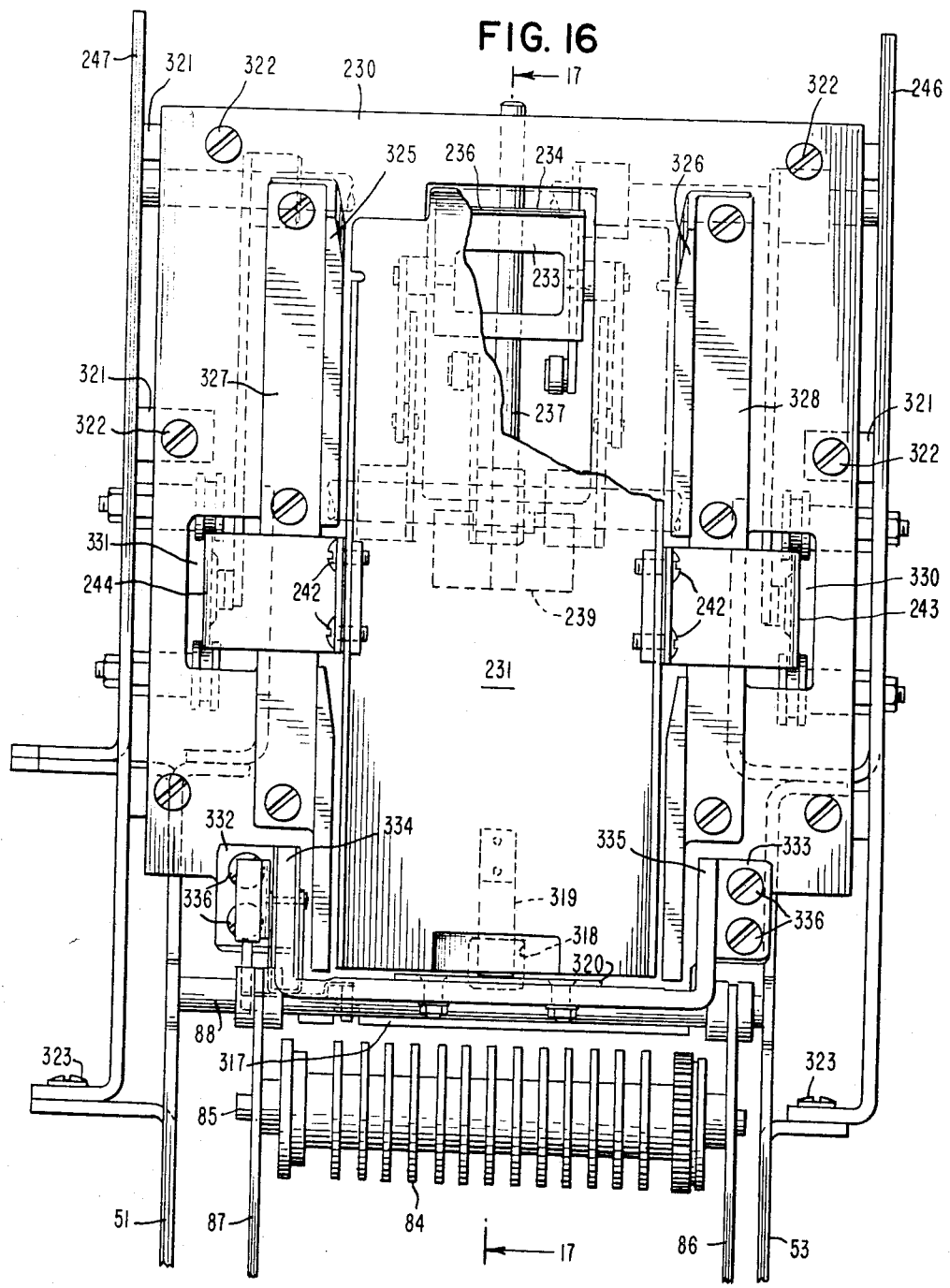

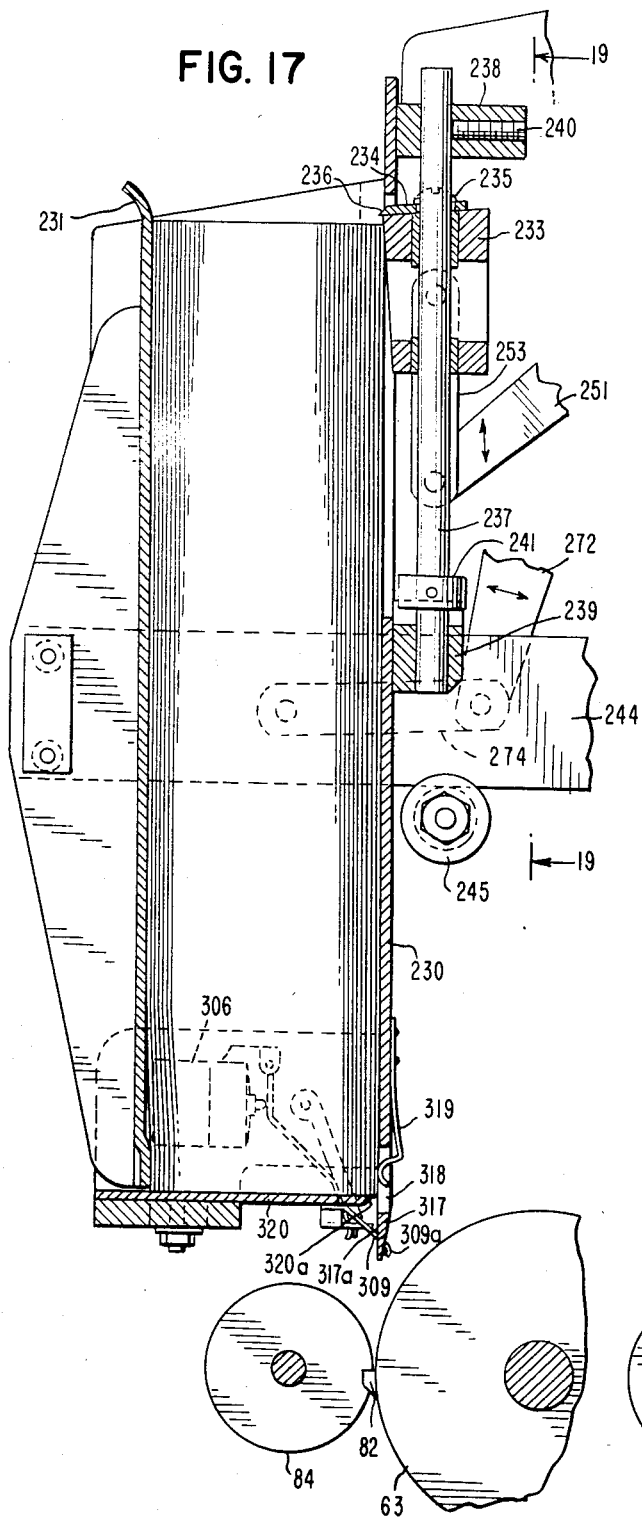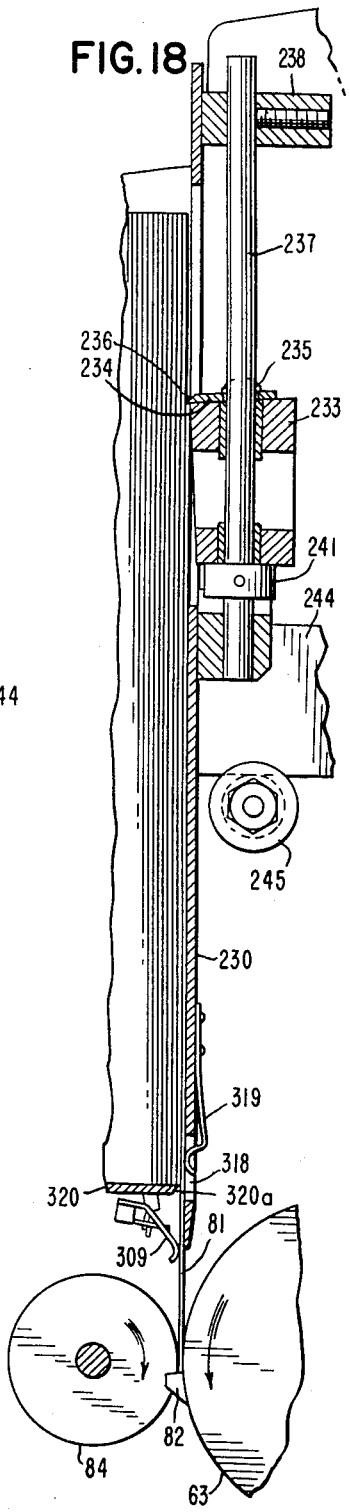

United States Patent Office 3,409,293
Patented Nov. 5, 1968

3,409,293
TABULATING CARD READER INPUT HOPPER FEED STRUCTURE
Wilbur C. Ahrns, Rochester, N.Y., assignor to Friden, Inc., a corporation of Delaware
Filed Feb. 11, 1965, Ser. No. 431,859
15 Claims. (Cl. 271—42)

The present invention relates to tabulating card readers. The invention more particularly relates to tabulating card readers which feed successive cards from an input card hopper, transport the cards endwise through a reading zone to an output hopper, and at the reading zone sense columns of coded apertures representative of coded information items and convert the sensed apertures to corresponding coded electrical signals representative of the information items.

The tabulating card reader of the invention is an improvement of the tabulating card reader disclosed in the copending application Ser. No. 249,228, of E. O. Blodgett, filed Jan. 3, 1963, now Patent No. 3,304,410, and in applicant's copending application Ser. No. 249,202, also filed on Jan. 3, 1963, both applications being assigned to the same assignee as the present application.

The reader of these copending applications accepts single tabulating cards manually inserted into reading position in the reader, and transports the cards endwise through a reading zone where an aligned row of lever-supported pivotal star wheels mechanically senses successive columns of coded apertures representative of successive items of coded information. Upon the sensing of a code aperture by a star wheel, the support lever of the latter moves and permits a mechanically driven interposer to close the contacts of an individual contact stack. Electrical interconnection of the contacts in these contact stacks enables conversion of the coded apertures in each card column to coded electrical signals representative of the corresponding item of aperture-recorded coded information. The tabulating card moves at constant velocity past the star-wheel reading zone of the reader, may be controllably halted at any card column, and drops by gravity into an output card hopper upon completion of reading of all card columns.

The initial feed of a tabulating card from a stack thereof to the reading station is a critical phase of the operation from the standpoint of reliability. That is to say, one of the most likely places for jamming of cards necessitating shut-down, or for undesired momentary discontinuity in the motion of the card through the reader, resides in the system of elements whose function is to pick one card from the pack and feed it to the reading station. It would be highly desirable to have an input hopper feed drive that obviates these difficulties and so allows the higher over-all performance of which the rest of the succeeding systems are more usually capable.

It is an object of the present invention to provide a new and improved tabulating card reader, and one possessing the desirable operational characteristics enumerated above.

It is a further object of the invention to provide a novel tabulating card reader adapted to select and read successive cards from a stack thereof supplied to the reader, and in so doing to provide a positive feed of a succession of single cards from the stack thereof such that any disruptive card feeding difficulties are avoided.

It is an additional object of the invention to provide an improved tabulating card reader having utility in numerous and diverse applications as a source of data information rapidly and accurately presented in a wide variety of forms suitable for computation and documentation.

Other objects and advantages of the invention will appear as the detailed description thereof proceeds in the light of the drawings forming a part of this application, in which:

FIGURE 1 is a perspective view of a tabulating card reader embodying the present invention;

FIGURE 5 is a cross-sectional view of that portion of the components adapted to advance the card through the reader shown in FIGURES 4 and 8 and taken along line 5—5 therein;

FIGURE 6 is a detail view of certain of the components shown in FIGURE 5 and taken along line 6—6 therein;

FIGURE 7 is a detail view of the parts shown in FIGURE 6 and taken along line 7—7 therein;

FIGURE 8 is a developed view of a portion of the arrangement of components shown in FIGURE 5 taken along line 8—8 therein;

FIGURE 9 is an enlarged detail view of a single tooth gearing arrangement shown in FIGURE 2;

FIGURE 12 is a sectional view of the program drum and associated components taken along line 12—12 in FIGURE 11;

FIGURE 13 is an end view of the program drum shown in FIGURE 11 and taken along a section through the shaft thereof viewed at line 13—13 in FIGURE 11;

FIGURE 16 is an elevational view of the input hopper shown in FIGURE 14 and taken along line 16—16 therein;

FIGURE 17 is a section view of the input hopper and associated components shown in FIGURE 16 and taken along line 17—17 therein, showing the components thereof in poised position ready to advance a card;

FIGURE 18 is a partial view of the apparatus shown in FIGURE 17 showing the components thereof at the position assumed when a card has been advanced from the pack;

FIGURE 22 is a detail section view taken along line 22—22 in FIGURE 8.

Figure 2:
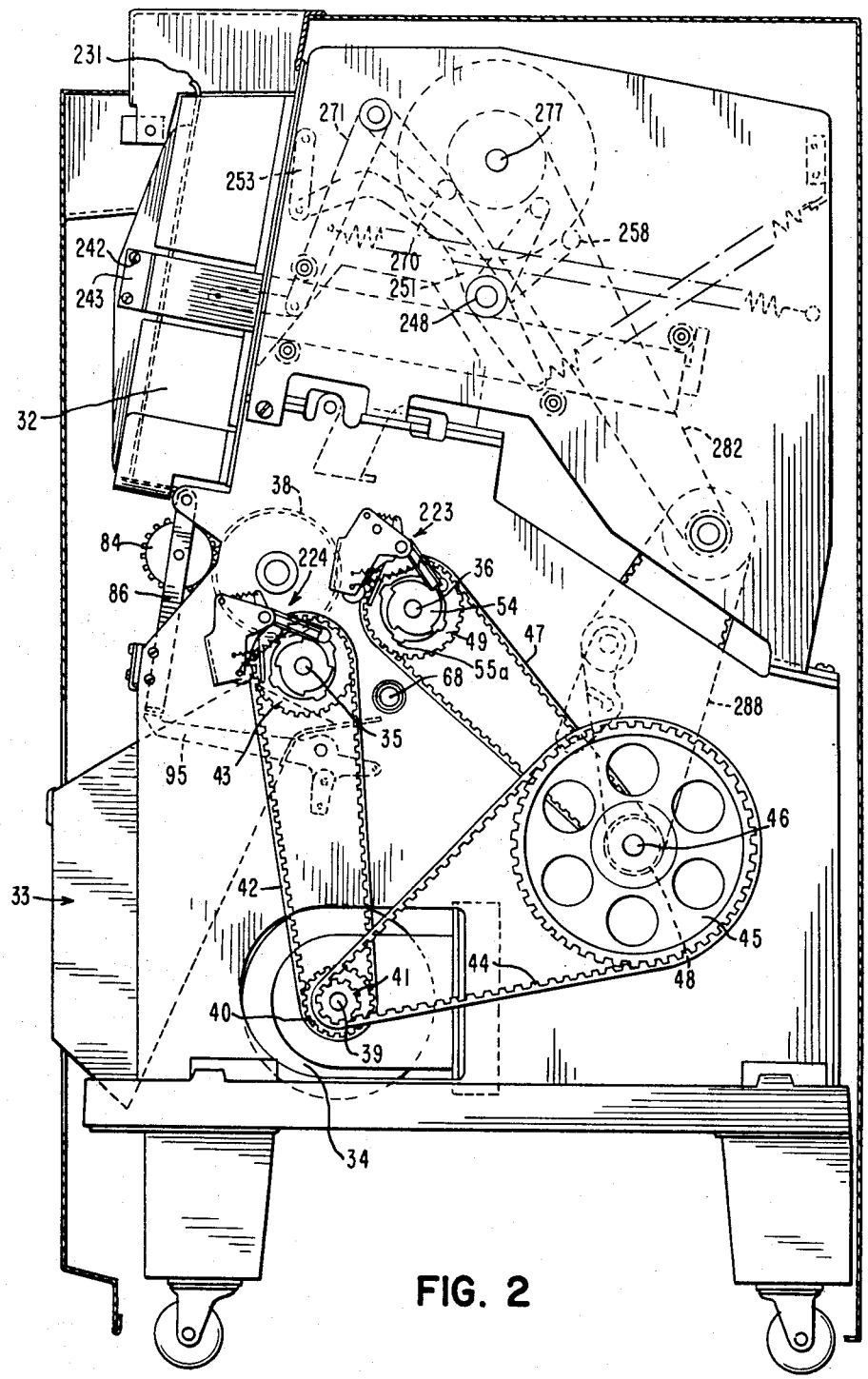
FIGURE 2 is an elevational interior view of the tabulating card reader shown in FIGURE 1.

Referring now to FIGURE 1, there is illustrated a tabulating card reader embodying the present invention in a particular form. The reader conveniently includes an outer console envelope 30 having a front panel 31 with an input tabulating card hopper 32 at the upper portion thereof and an output card hopper 33 at a lower portion thereof, all as shown in FIGURE 1, and supporting a series of control electrical switches 31a useful in manually controlling the reader operation and the selection of various available card read programs.

Figure 3:
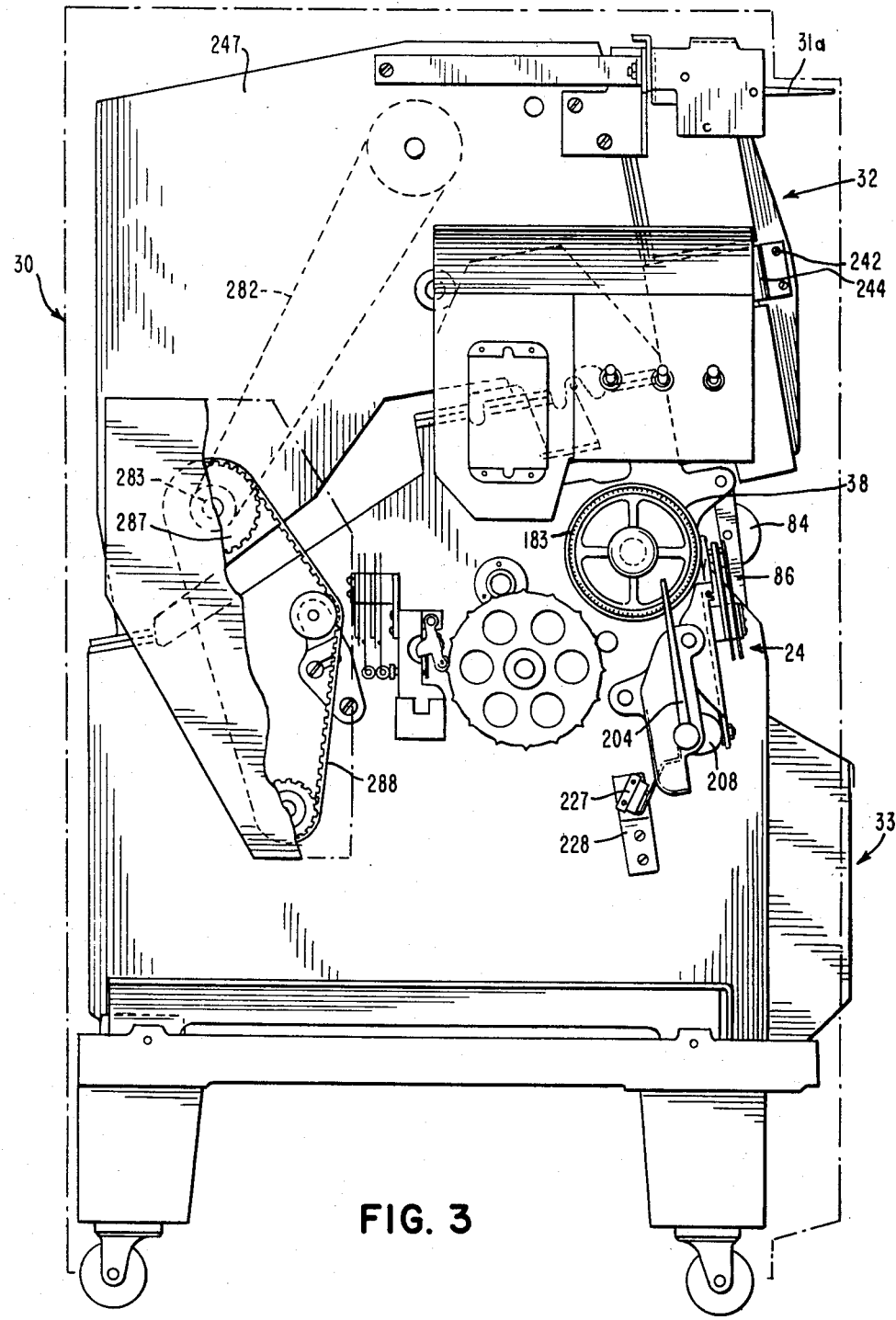
FIGURE 3 is an elevational interior view of the opposite side of the tabulating card reader shown in FIGURE 2.

As will be best understood by recourse to FIGURES 2 and 3, a motor 34 (FIGURE 2) is appropriately belted to drive two clutch shafts 35 and 36 at different speeds. Shaft 35 constitutes a high or skip speed shaft and shaft 36 constitutes a low or read speed shaft. The shafts 35 and 36 are selectively effective to cause reading of a card 81a picked from a pack 81 in input hopper 32 during passage of the card endwise along a reading station intermediate the traverse between input hopper 32 and output hopper 33. Throughout this specification, it will be understood that reference to a card 81a refers to any card in the stack of cards 81, in its identity as a picked card progressing through the reader. As will be hereinafter described in detail, a program drum 38 (FIGURE 3) operates to select which of the two drive shafts 35 and 36 are effective, and consequently whether or not a particular portion of the field of the card in the reading station is read at reading speed or skipped at high speed.

Figure 4:
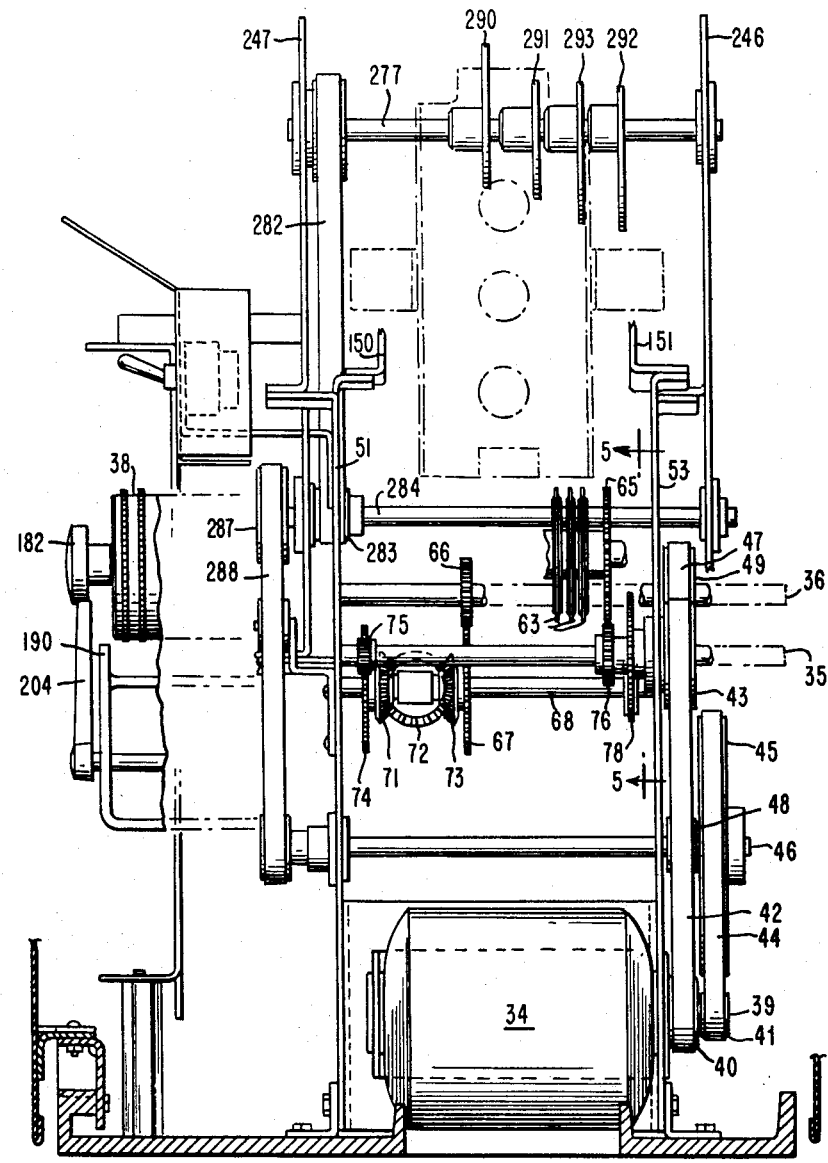
FIGURE 4 is a front elevational interior view of the reader shown in FIGURE 1 showing certain of the parts with portions thereof and details thereof omitted for clarity.

With additional reference to FIGURE 4, motor 34 includes motor shaft 39 which carries a pair of belt pulleys 40 and 41. Pulley 40 drives high skip speed clutch shaft 35 via belt 42 and pulley 43. The shaft 35 speed is slightly reduced, in the illustrative embodiment, relative to the motor shaft 39 speed. Pulley 41 on motor shaft 39 drives read speed shaft 36 through a speed reduction drive comprising the belt 44 connection of motor pulley 41 to pulley 45 on idler shaft 46, and thence the belt 47 connection of pulley 48 on idler shaft 46 to pulley 49 on read speed clutch shaft 36. Because of the intermediate speed reduction pulleys 45 and 48, the read shaft 36 speed is a small fraction of the skip shaft 35 speed.

As may be seen by additional reference to FIGURES 5 through 8, the read clutch shaft 36 is journalled at one end by a bearing structure 50 in a side plate 51 and is journalled near the opposite end by a bearing structure 52 in a side plate 53. The shaft 36 is driven by pulley 49 through the wrap spring clutch 54, which is itself also journalled in bearing structure 52. The clutch 54 is of conventional construction such as illustrated in FIGURES 4 to 7 of U.S. Patent No. 2,927,158, except that (FIGURES 2 and 8 herein) four detent protuberances 55a and keeper notches 55b are provided on the respective clutch housing 55c and keeper member 55d and four knock-off lobes are provided on the clutch cam 56 rather than the pairs of these elements illustrated for the 180° clutch construction of the patent last mentioned. The clutch 54, according to the energization or deenergization of its control electromagnet, is thus operative at 90° rotational angles of the shaft 36 to connect the shaft to or disconnect it from the pulley 49 and thence to the source of driving power in motor 34.

Similarly, the high speed skip shaft 35 is journalled at one end in a bearing structure 57 in side plate 51, while the opposite end thereof is journalled in bearing structure 58 in side plate 53. A high speed wrap spring clutch 59 corresponds in structure and operation to read speed clutch 54 already described. Specifically, the clutch 59 connects, at 90° angles of the shaft 35, the power-driven pulley 43 to the shaft 35 in the manner already described, by means of the four detent protuberances 60a and keeper notches 60b on the respective clutch housing 60c and keeper member 60d, and four knock-off lobes are provided on clutch cam 61.

The reader includes a shaft 64 carrying a tabulating card main drive roll 62 fabricated with spaced card-engaging driving discs 63. The shaft 64 is journalled in side plates 51 and 53 at bearing structures 79 and 80. The program drum 38 is carried on the opposite side of bearing structure 79 by an extension of shaft 64 so that program drum 38 is driven by, and rotated in synchronization with, drive roll 62. The main drive roll 62 is provided with a gear 65 which is driven from either high skip speed shaft 35 or read speed shaft 36 by means of a train including a differential gear arrangement.

Thus, differential shaft 68 is journalled at opposed end portions to side plates 51 and 53 by bearing structures 69 and 70 respectively. On shaft 68 is a differential gear box including a bevel gear 71 free to rotate on shaft 68 and a bevel gear 73 also free to rotate on shaft 68. Bevel gears 71 and 73 are free of each other, but are mutually meshed with planetary gear 72 which is free to rotate on a stud 72a which is secured at right angles to shaft 68. Bevel gear 71 rotates in tandem with gear 74, and bevel gear 73 rotates in tandem with gear 67. Gear 74 is meshed with gear 75 which is fixed to high skip speed shaft 35, while gear 67 is meshed to gear 66 which is fixed to read speed shaft 36. Gear 77 is fixed to shaft 68 and is meshed with gear 78 which is free to rotate on high speed shaft 35. Gear 76 is fixed in tandem to gear 78, and is meshed with gear 65 of drive roll 62.

The objective of the arrangement is to allow drive of roll 62, and thereby drive of the card 81a, in precise manner such that when the drive roll 62 stops, an index column on cards 81a will always be exactly aligned with the star wheels 122, regardless of changing back and forth between low speed drive from shaft 36 and high speed drive from shaft 35. To that end, either of shafts 35 and 36 is held motionless while the other shaft is driving, so that when the motionless shaft resumes the driving it does so from the aligned orientation, as aforesaid, at which it was last stopped.

Tracing the train of driving elements will illustrate this. Assume that clutch 54 was deenergized and clutch 59 was energized. Read speed shaft 36 will have stopped in the aforesaid aligned position due to the action of clutch 54. Power at high skip speed shaft 35 is transmitted to gear 75 thereon, and hence to gear 74 and bevel gear 71. Since the latter two gears are free on shaft 68, they do not directly turn that shaft. Gear 71 tends, through planetary gear 72, to turn gear 73 and thus gear 67. However since three reversals of sense of rotation would thus be involved from shaft 35 to shaft 36, that would cause shaft 36 to reverse from its usual sense, and clutch 54, being of one-way construction, will not allow that. Gears 73 and 67 are thus stopped relative to gear 66 which is stopped by clutch 54. The turning tendency of gear 71 causes planetary gear 72 to roll around the now fixed gear 73, and this propels shaft 68 to which gear 72 is radially fixed by stud 72a. The rotation of shaft 68 drives gear 76 via gears 77 and 78, and gear 76 drives drive roll 62 via gear 65. The interaction of the train of elements is thus such that shaft 35 drives drive roll 62 while shaft 36 is held fixed.

Now assume that clutch 59 is de-energized while clutch 54 is energized. High skip speed shaft 35 will have stopped in an aligned position due to the action of clutch 59. Power is thereafter fed from gear 66 on shaft 36 to gears 67 and 73 on shaft 68. Gears 71 and 74 on shaft 68 cannot rotate, because their driven sense would cause shaft 35 to rotate opposite to its normal sense. Clutch 59 thus stops gear 75 and thereby gears 74 and 71, and thus gear 73 forces planetary gear 72 to roll around the now fixed gear 71 thus propelling shaft 68 with it. Shaft 68 thereby drives drive roll 62, again through gears 77, 78, 76, and 65. The interaction of the train of elements is such that shaft 36 drives main drive roll 62 while shaft 35 is held fixed.

The ratio of the various gears is chosen to propel drive roll 62 at speeds proportional to the speeds of respective pulleys 43 and 49. Additionally the gearing is chosen so that whichever shaft is doing the driving, a 90° advance thereof causes an advance of drive roll 62 such that the circumferential travel thereof is equal to the distance between adjacent index-point columns on a card 81a driven thereby.

Figure 10:
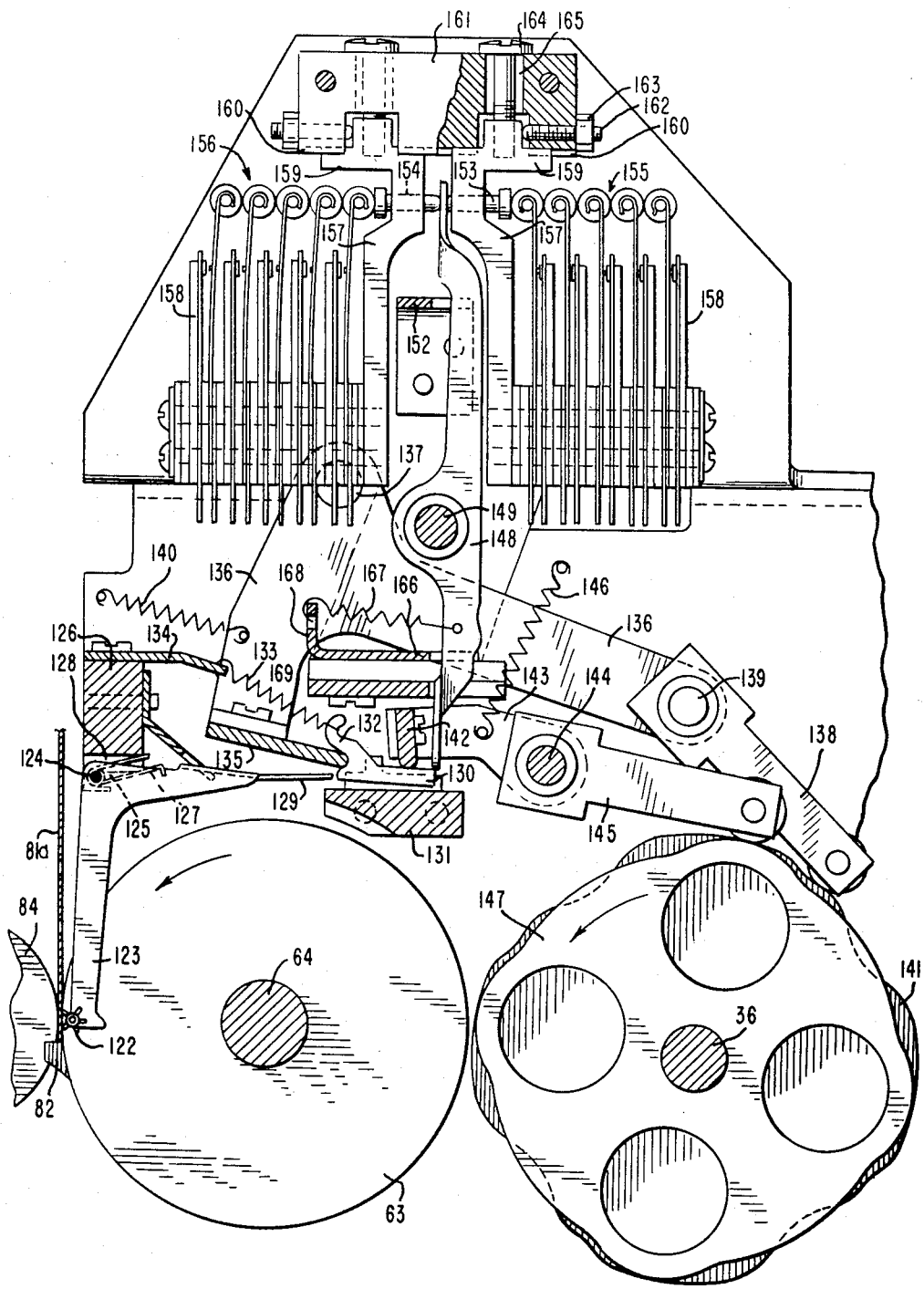
FIGURE 10 is an elevational cross-sectional view of the upper portion of the reader to illustrate the construction, arrangement and character of operation of the tabulating card reading components in relation to initiation of each card reading operation of the reader.

Referring now additionally to FIGURE 10, a tabulating card 81a is moved lengthwise from the input card hopper 32 into reading position in the reader. In the home position of the reader, at which the reading of each tabulating card begins, spaced ones of the main drive roll discs 63 are provided with projecting stop portions 82 which engage the end of the tabulating card 81a upon insertion of the card into reading position in the reader.

The reader is also provided with a card feed pressure roll 83 (FIGURE 8) fabricated with spaced discs 84 in opposed relation to discs 63. The pressure roll 83 is rotatably supported upon a shaft 85 extending between side arms 86 and 87 which are secured to shaft 88 which is rotaitonally supported by side plates 51 and 53. The pressure roll 83 is provided at one end with a gear 89 in meshed engagement with the gear 65 on main drive roll 62. This meshable relationship of the gears 89 and 65 is maintained even during intervals when the main drive roll 62 and pressure roll 83 are moved to spaced relation near the end of each card reading operation. This spacing of the rolls is accomplished by segmental gears 90 and 91 provided as shown (FIGURES 8 and 9) in axially aligned positions on the corresponding roll-62-carried-disc 92, respectively, in cooperation with the engagable similarly aligned one-tooth gear segments 93, 94, provided at opposed ends of pressure roll 83.

Upon separation of the main drive roll 62 and pressure roll 83, by rotational engagement of the segmental gears 90, 91, with their associated one-tooth gear segments 93, 94, as occurs once for each complete revolution of the main drive roll 62, both of the pressure roll supporting arms 86, 87, are moved into latched engagement with individual ones of a pair of latch arms 95 (FIGURES 2 and 5–7) which are secured on a sleeve 96 rotatably supported on a shaft 97 extending between the side plates 51, 53. The latch arms 95 are biased into latching position by a helical wire spring 98. An arm 95a on each latch 95 is connected to a mutual strap 99 extending therebetween which forms an armature for the pole pieces of electromagnets 100 supported on a bracket 101 extending between the side plates 51, 53.

The initial conditioning of the reader for each new card reading operation is accomplished by brief electric energization of the electromagnets 100, which attract the bracket 101 and rotate the latch arms 95 out of engagement with latch notches 102 provided on the remote ends of the pressure roll 83 supporting arms 86, 87. The latter are biased by helical wire springs 103 for rotation of the shaft 88 to engage the pressure roll 83 against a tabulating card inserted into reading position in the reader and thus press the tabulating card against the discs 63 of the main drive roll 62. The gears 89 and 93 effect positive drive of the pressure roll 83 from the main drive roll 62 so that both rolls are effective in drivingly transporting the card through the reader. This double-roll drive of the card avoids any possibility of slippage between the card and the main drive roll 62 so that successive index-point columns of the card are always accurately positioned for reading. Subsequent successive brief energizations of the electromagnet 223 of the read speed clutch 54 or the electromagnet 224 high skip speed clutch 59, effects step-by-step transport of the tabulating card by drive of the main drive roll 62 from, respectively, shaft 36 or shaft 35, each such step transport of the card corresponding to the space between successive index-point columns of the card.

The pressure roll supporting arms 86 and 87 are guided in their rotational movement on the shaft 88 by one-tooth comb brackets 104 mounted on individual L-shaped brackets 105 secured to the respective side walls 51 and 53. One of the brackets 105 also supports an electrical contact assembly 106 (FIGURES 5 and 7) having movable contacts which are actuated by an L-shaped bracket 107 secured to the arm 87. In particular, the contacts of the contact assembly 106 are in open-contact position when the pressure roll 83 is latched in spaced relation to the main drive roll 62, and are actuated to closed-contact position when the pressure roll 83 is unlatched and moves to card engaging position. These electrical contacts are used in providing an indication in the electrical control system of the reader as to whether or not the pressure roll 83 is in its card engaging position.

As shown more clearly in FIGURES 8 and 22, the main drive roll 62 is provided at one end with a cam disc 108 having on its periphery a single notch 109 engagable by a pivoted feeler lever 110 which operates a microswitch 111 mounted on a bracket 112 secured to side wall 51. The notch 109 of the cam disc 108 is located at the earlier mentioned "home" position of the main drive roll 62. This is the position at which each tabulating card reading operation of the reader terminates and a new reading operation subsequently begins, and the operation of the microswitch 111 by the feeler lever 110 thus provides an indication in the electrical control system of the reader as to whether or not the reader is at its "home" position.

The read speed driven shaft 36 (FIGURE 8) is provided with a plurality of spaced cams 113 which are fixedly secured to rotate with the shaft. These cams operate individual contact subassemblies 114 (FIGURE 5) which are non-rotatably positioned by a longitudinal slot 115 formed as shown in the upper face of the spacing bar 116 between side plates 51 and 53, and which are secured to the bar 116 by machine screws 117. The contact subassemblies 114 include a cam-follower arm 118 biased into contact with the associated cam 108 by a leaf spring 119 which also through a plunger 120 actuates the movable contacts of an electrical contact assembly 121. These electrical contacts are used in a more complete electrical control system in which the tabulating card reader forms one part.

The reader includes a plurality of tabulating-card-code-aperture-sensing star wheels 122 rotatably supported as shown in FIGURE 10 at the ends of individual bell cranks 123, of U-shaped cross section, pivotally supported upon a shaft 124 positioned within a notch 125 in a spacing bar 126 extending between side plates 51 and 53. The bell cranks 123 with their star wheels 122 are received between the flanges 63 of the main drive roll 62 as illustrated in FIGURE 8. The star wheels of the several bell cranks 123 are aligned to sense concurrently each successive index-point column of the tabulating card transported through the reader, each of the star wheels sensing the code apertures in an individual index-point row of the card. Each of the bell cranks 123 is biased by a wire spring 127 toward code aperture sensing position wherein its associated star wheel 122 senses the presence and absence of code apertures in the tabulating card. Consider, for example, the "home" position of the main drive roll 62 illustrated in FIGURE 10 where the projecting stop portions 82 engage and preposition the leading end of the tabulating card 81 in readiness to begin a reading operation. The leading end portion of the card has an unperforated area preceding the first index-point column of the card and, accordingly, two adjacent teeth of each star wheel 122 engage the surface of the card to maintain the bell cranks 123 rotated to a counterclockwise position as seen in FIGURE 10. When a code aperture is sensed in the card by the star wheel 122, a tooth of the star wheel projects through the code aperture and thus permits the associated bell crank 123 to rotate slightly in the clockwise sense (as viewed in FIGURE 10). These slight angular movements of the bell cranks 123 are guided by a comb 128 secured to the spacing bar 126.

The remote ends of the bell cranks 123 are provided with a flat latch portion 129. In the non-aperture sensing position of each bell crank 123, as illustrated in FIGURE 10, the latch portion 129 is positioned to be engaged by an individual one of a plurality of pivotally supported reciprocal interposers 130 to restrict the range of reciprocal motion of the latter effected in a manner presently to be described. In the aperture sensing position of the bell crank 123, the latch portion 129 of the bell crank is positioned beneath its associated interposer 130 and thus does not limit the range of reciprocal motion of the interposer.

All of the interposers 130 are reciprocally guided by grooves formed in the upper portion of the spacing bar 131. Each interposer has an S-shaped end portion 132 biased by a helical wire spring 133, extending between the interposer end portion 132 and a spring anchor plate 134 secured to the spacing bar 126, into engagement with a bail 135. The latter is supported at its ends by bell cranks 136 pivoted on individual studs 137 secured to the side plates 51 and 53 of the reader. The bail 135 and its supporting bell cranks 136 are reciprocated through a cycle of angular motion during each 90° rotation of the driving shaft (35 or 36) which, as previously explained, causes the main drive roll 62 to advance the tabulating card from one of its index-point columns to another.

This reciprocatory motion of the bail 135 and its supporting bell crank arms 136 is accomplished by a cam follower 138 which is fixed upon a shaft 139 having its ends fixed to the bell crank arms 136, the cam follower arm 138 being biased by a spring 140 into engagement with a cam 141 fixedly secured to the read speed shaft 36. As indicated in FIGURE 10, the cam 141 has four repetitive lobe-like configurations spaced by 90° corresponding to the four 90° angular rotational step movements of the shaft 36 under control of the clutch 54. Each of these repetitive lobe configurations of the cam 141 includes a high step, an intermediate step, and a low step. In each angular halt position of the shaft 36 as controlled by the clutch 54, the cam follower 138 rests upon the intermediate step of the cam 141 as indicated in FIGURE 10. This positions the bail 135 such that the interposers 130 have their ends spaced a short distance from the latch portion 129 of each of the star wheel bell cranks 123.

For this position of the bail 135, all of the interposers 130 are engaged by an unlatch bail 142 which is supported at its ends by arms 143 fixedly secured to a shaft 144 journalled in the side plates 51 and 53. A cam follower 145 is secured to the shaft 144 and is biased by a spring 146 into engagement with a cam 147 secured on the read speed shaft 36 and having four raised lobes spaced 90° around the periphery of the cam 147. Upon engagement of the unlatch bail 142 with the interposers 130 at a time when the cam follower 145 rests upon a lobe of the cam 147, the right hand ends of the interposers 130 (as seen in FIGURE 10) are depressed by the bail below the lower ends of individual ones of a plurality of contact actuating levers 148 pivotally mounted on a shaft 149 supported between side walls 150 and 151 (FIGURE 4) which are in turn secured to side walls 51 and 53 respectively.

The contact actuating arms 148 may rotate through a small arc in a manner presently to be described, and are guided in this motion by a comb 152 supported between the side walls 150 and 151. The upper end of each of the arms 148 engages oppositely disposed but axially aligned contact actuating pins 153 and 154 of two contact subassemblies 155 and 156, each having a base support member 157 upon which are mounted a stack of electrical contacts 158. Each of the base members 157 has an end foot portion 159 of rectangular cross-section which is received within and positioned by an individual one of plural transverse grooves 160 milled into the lower face of the spacing bar 161 and is positioned laterally within the groove by a set screw 162 having a lock nut 163 to lock the set screw in adjusted position. Each of the subassemblies 155 and 156 is secured in assembled relation with the spacing bar 161 by a machine screw 164 which extends through an elliptical aperture 165 of the spacing bar 161. The contact subassemblies 155 and 156 are positioned in sets in opposing relation transversely fo the spacing bar 161 and there are plural sets of such subassemblies spaced longitudinally of the spacing bar 161. The total number of these sets corresponds to the number of star wheel bell cranks 123 with which the reader is provided to read a tabulating card having the same number of index-point rows. Since the index-point rows of the tabulating card are conventionally spaced more closely than it is conveniently feasible to space the relatively wider subassemblies 155 and 156 longitudinally of the spacing bar 161, the contact actuating levers 148 are offset from end to end. The amount of such offset varies with the relative position of a given one of the interposers 130 and the position of the corresponding contact subassembly set 158 and 159.

The contact actuating arms 148 are guided at their lower ends by a comb 166 extending between and secured to the side plates 51 and 53. The actuating arms 148 are biased by a spring 167, extending between each actuating arm and an upturned forward edge flange 168 provided on the comb 166, into engagement with the edge of a transverse stop bar 169 secured beneath the comb 166. With the actuating arms 148 in engagement with the stop bar 169, the lower ends of the actuating arms overlie in latching relation the right-hand ends (as seen in FIGURE 10) of the interposers 130 and thus prevent the latter from pivoting about the bail 135 under bias of the springs 140. Also in this position of the actuating arms 148, the electrical contacts of the contact subassembly 155 are in closed contact position and the electrical contacts of the subassembly 156 are in open position.

Figure 11:
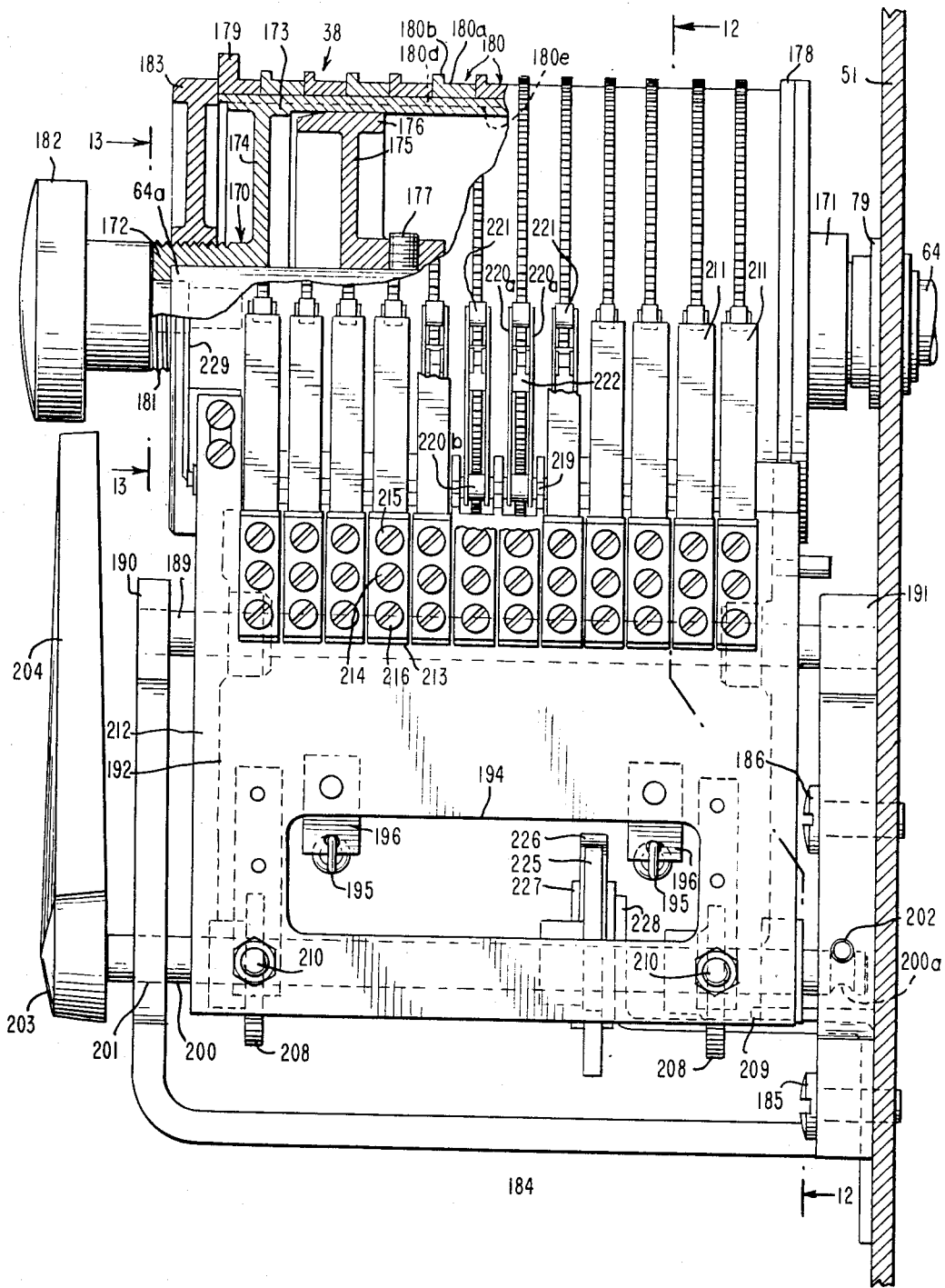
FIGURE 11 is a partially sectioned detail view of the program drum and associated components shown in the general arangement of parts of FIGURE 4.

Referring now additionally to FIGURES 11, 12, and 13, the program drum 38 comprises a drum frame indicated generally at 170 which includes a butt end 171 and a hub end 172 which respectively accepts the shaft 64 and accepts and journals the shaft end 64a. A cylindrical outer annulus 173 is integrally supported in axial relation to hub 172 and butt 171 by a web 174 at each respectively. A key member 175 is coaxially mounted relative to both shaft 64 and outer annulus 173, and includes an extension 176 which is axially keyed to outer annulus 173. A set screw 177 locks key member 175 to shaft 64, and thereby rotationally locks outer annulus 173 and thus drum frame 170 to shaft 64.

The drum frame butt end 171 includes an end plate 178. A removable annular end member 179 is provided and adapted to slidably fit over the outer annulus 173 of drum frame 170. A plurality of program rings 180 are axially fit over the outer annulus 173, for a purpose to be hereinafter described. The length of outer annulus 173 is such as to accept an integral plurality of program rings 180 and end mmeber 179 upon the annulus 173 and in abutment with end plate 178. Hub end 172 is provided with external threads 181 and terminates in a knob 182. A calibrated index disc 183 is axially engaged upon threads 181 and carries peripherally (FIGURE 13) a series of numerals and numeral points ranging from "0" to "80." By turning the index disc 183 upon threads 181 so that it approaches end plate 178, an assembly of program rings 180 and end member 179 may be axially secured on outer annulus 173.

Each program ring 180 is preferably fabricated of a relatively low tear or shear strength material, such as plastic, for a purpose to be described. While many plastics and non-plastics may be employed, one example is to fabricate rings 180 in phenol-formaldehyde resin. Each ring 180 includes a base annular portion 180a and a raised annular portion 180b. The base portion 180a functions to axially space the successive raised portions 180b when a plurality of rings 180 are axially mounted on annulus 173. The raised annulus portion 180b of each ring includes spaced division into a number of teeth 180c (FIGURE 12). The number of teeth 180c occupying the raised annulus 180b will depend upon the number of index-points contained in each row of the card 81a. It is usual with Hollarith cards to employ eighty index-points in each row, and in such a system eighty-five teeth 180c are employed, and eighty are indexed at index disc 183. In all cases the number of teeth 180c will be at least equal to the number of index-points in each row of card 81a, and preferably a few greater, as for example, the five greater in the illustrated eighty-five tooth rings. The number of rings 180 employed on drum 38 corresponds to the number of rows in card 81, and in the Hollarith card system twelve rings will be employed as illustrated in FIGURE 11. An index-point on card 81 has plural co-ordinates (row and column) and is thereby uniquely correlatable to a specific one of teeth 180c on a specific one of rings 180. Each ring 180 is held against rotational movement upon outer drum annulus 173 by a key 180d integral with each ring 180, which axially rides in a groove 180e in drum outer annulus 173.

While the above-described use of separate program rings 180 on program drum 38 is convenient and preferred, it is also possible to fabricate the member occupying the outer annulus 173 of drum 38 as a single unitary construction (still with teeth 180c) rather than as a plurality of separate rings 180. Also, it is not necessary that the structure occupying annulus 173 including the teeth 180c, be fabricated in a breakable material as aforesaid. This is true whether separate rings or the aforesaid unitary structure occupies annulus 173. In that case, other materials may be chosen for the structure occupying annulus 173, and rather than being breakably removable as aforesaid, teeth 180c may instead be individually keyed or otherwise removably and replaceably connected to the program drum 38. Finally, it is not necessary that the structure immediately carrying teeth 180c be a separate component of drum 38. Particularly when teeth 180c are arranged to be replaceable, i.e., removable without breaking, it may be advantageous to employ a more unitary program drum 38.

A contact assembly support frame 184 (FIGURES 11 and 12) is secured to side plate 51 by machine screws 185 and 186 through flanges 187 and 188 respectively. A shaft 189 is carried between the arm 190 and the flange 191 of support frame 184. A contact plate 192 has a pair of flanges 193 which are rotatably mounted on shaft 189. The main body of contact plate 192 is thereby pivotable about shaft 189 within the embrace of portions 190 and 191 of support frame 184. Through an aperture 194 in plate 192 passes a pair of helical springs 195. The springs 195 are secured to spring mounts 196 on plate 192 and to spring mounts 197 on support frame 184, by respective screws 198 and 199. Springs 195 thereby act to bias plate 192 in the counter-clockwise direction about shaft 189, as viewed in FIGURE 12.

A shaft 200 is rotatably mounted within arm 190 of frame support 184 at circular aperture 201 and is journalled at groove 200a of flange 191 by a pin 202. At the free end of shaft 200 is secured a knob 203 bearing a lever 204, for the purpose of manually rotating shaft 200 within a limited arc. A stop member 205 (FIGURE 12) fixedly secured to shaft 200 is provided with two circular outer portions, 205a and 205b, the latter portion being of smaller radius, and the two portions 205a and 205b cooperate to define stops 206 and 207. A pin 209 is fixedly secured to frame support 184 so as to be located from the center of shaft 200 a distance slightly greater than that of surface 205b, so as to intercept stops 206 and 207 respectively during counter-clockwise and clockwise rotation (as viewed in FIGURE 12) of shaft 200. The stops 206 and 207 are situated about 180° apart, and consequently lever 204 with shaft 200 may be rotated within a 180° arc.

Also fixedly secured to shaft 200 is a pair of eccentric cams 208, located at axial positions on shaft 200 respectively near portions 190 and 191 of frame support 184. The cams 208 have a high portion 208a and a low portion 208b spaced approximately 180° apart, with intermediate portions 208c diminishing from the high to the low portions. At a position on frame 192 adjacent each cam is provided a set screw 210 which acts as a cam follower for the associated cam. The cams 208 are fixed on shaft 200 with relation to the fixed positions on shaft 200 of stops 206 and 207 so that when shaft 200 is stopped by stop 206 the high point of cams 208 has slightly overridden the followers 210, while when the shaft 200 is stopped by stop 207 the low point of cams 208 has not quite reached the followers 210. The slight override and underride promotes stability of the followers on the cam at the stop 206 and stop 207 positions. The cams 208 thereby are effective to pivot the plate 192 about shaft 189 and against the bias of springs 195 in response to movement of lever 204.

When plate 192 is pivoted about shaft 189 by the action of lever 204 and cams 208, end 192a of plate 192 is pivoted toward and away from the outer periphery of program drum 38 as cams 208 are moved to the high and low contacts with followers 210 respectively. Mounted at end 192a of plate 192 is a plurality of program drum electrical contact subassemblies 211. Secured to plate 192 is a dust cover 212 which protects the subassemblies 211 from damage. Each subassembly 211 is mounted at a position on plate 192 (FIGURE 11) aligned with the raised annulus 180b of teeth 180c of respective ones of the program rings 180 on the drum 38. There are thus, in the illustrated twelve ring 180 embodiment, twelve contact subassemblies 211 aligned therewith. It will be apparent that if, as aforesaid, a unitary structure is employed instead of separate rings, teeth 180c will still be arranged in circumferential rows on drum 38, and consequently the same number and arrangement of contact subassemblies 211 may be employed.

Each contact subassembly 211 includes a terminal block 213 secured to plate 192 by a screw 214. Additional screws 215 and 216 hold the terminal block 213 together and constitute respectively electrical terminals for contact arms 217 and 218. Contact arm 218 is passive, while contact arm 217 constitutes a spring normally biasing its contact 217a against contact 218a of contact arm 218, so that the contacts are normally closed. Carried at the extreme of end 192a of plate 192 is a series of flanges 192b which mutually carry a shaft 219. On shaft 219 and between adjacent pairs of flanges 192b, a roller arm 220 is provided for each contact subassembly 211. The roller arm 220 is freely pivotable on shaft 219, and constitutes a pair of members 220a defining a slot therebetween (FIGURE 11) and joined at one end by a pivot ferrule 220b which accepts shaft 219 and at the other end by a roller wheel 221. At an intermediate point between the pair of members 220a is mounted an extension 222 which extends through an aperture 218b in contact arm 218 and toward contact arm 217. When roller wheel 221 is riding on the outer periphery of teeth 180c of the program ring raised annulus 180b, as illustrated in FIGURE 12, the extension 222 reaches contact 217 and holds it against its spring bias and away from contact with contact arm 218 so that contacts 217a, 218a, are open.

The diameter of roller wheel 221 is related to the spacing and depth of teeth 180c of program ring 180. The normal spacing between teeth 180c is insufficient to allow roller 221 to enter, so that extension 222 is essentially at a constant relation to contact arm 218 when normally spaced teeth pass beneath roller 221. The contacts 217a, 218a, are thus normally held open by the presence of normally spaced teeth 180c. The spacing of teeth 180c is also such, with relation to the diameter of roller 221, that even one missing tooth 180c allows the roller 221 to move to the right (as viewed in FIGURE 12) under the bias of contact arm 217 via extension 222, a sufficient distance so that contacts 217a, 218a, are closed while the roller 221 occupies the position of the missing tooth. A series of adjaent missing teeth induces a longer period of closed contacts 217a, 218a. Thus by breaking off (or, where appropriate, by otherwise removing) selected teeth 180c on selected ones of program rings 180 (or, where appropriate, in selected circumferential rows in a unitary structure), a set of contacts 217a, 218a, can be closed during selected periods corresponding to the presence of the aperture created by those missing teeth under the related one of the plurality of rollers 221. Since the program drum 38 is on a common shaft with main drive roll 62, proper initial adjustment of the position of the missing teeth 180c by reference between index discs 183 and fixed pointer 229 (FIGURE 13) will close contacts 217a, 218a, during traverse of any desired one or more index-points on card 81 by star wheels 122. The signals derivable at the plurality of terminals 215, 216, are utilized to control various functions of the reader, as will be more fully described hereinbelow. One of these functions is the switching from read speed to high skip speed drive of card 81a.

Shaft 200 (FIGURE 12) carries a cam 225 which is active to press and release a contact arm 226 associated with microswitch 227 which is mounted to side plate 51 by S-shaped bracket 228. Cam 225 is fixed to shaft 200 at a position to engage arm 226 and close the contacts of microswitch 227 when cam 208 has its high position under cam follower 210, as illustrated in FIGURE 11. At the low position of cam 208, cam 225 is positioned to disengage arm 226, and arm 226 being spring biased away from microswitch 227, allows the contacts of microswitch 227 to open.

Positioning lever 204 so that the low portion of cam 208 is under cam follower 210 allows contact subassembly 211 to move counter-clockwise, as viewed in FIGURE 12, so that rings 180 or the whole program drum 38 may be removed and the like. However, such movement of subassembly 211 away from program drum 38 also allows contacts 217a, 218a, to close. The microswitch 227 acts as an interlock in the circuit of contacts 217a, 218a, such that a spurious signal produced at 217a, 218a, by turning of cam 208 to its low position meets an open circuit at microswitch 227 because cam 225 has also thereby been turned to disengage arm 226.

Referring now additionally to FIGURES 14-21, the input hopper 32 (FIGURE 14) is constructed to accommodate a pack of individual cards 81 between a back plate 230 and a pressure plate 231. The single example card 81a is drawn from the face of deck 81 adjacent to back-plate 230, and then travels (FIGURE 18) from input hopper 32 downwardly to the "home" position between card driving discs 63 and spaced discs 84 and thence through the reading position and along the path indicated at 232 to the output hopper 33. As aforesaid, any card of deck 81 is designated herein as 81a when it occupies the position illustrated in the figures with that designation.

The driving elements adapted to pick card 81a from hopper 32 and deliver it to the "home" position between discs 63 and discs 84 include a picker 233 including a knife 234 (FIGURES 14, 17 and 18) secured to the uppermost portion thereof by a machine screw 235 so that an edge 236 of the knife 234 protrudes over the picker 233 body a distance just equal to or slightly less than the thickness of card 81a. Picker 233 is slidably mounted on vertical shaft 237 which is fixedly mounted to back-plate 230 by blocks 238 and 239. Shaft 237 is secured thereto by set screw 240, and a cushion 241 of hard rubber or similar material acts as a stop atop lower block 239. Picker 233 is thus adapted to ride up and down shaft 237 between the position shown in FIGURE 17 and the position shown in FIGURE 18 picking and driving a different card 81a on each downstroke.

Pressure plate 231 is secured by machine screws 242 to slide members 243 and 244 which are mounted on rollers 245 so as to be free to reciprocate back and forth carrying pressure plate 231 toward and away from pressured contact with the deck of cards 81 in inlet hopper 32. As is best shown in FIGURE 15, a pair of side plates 246 and 247 are secured at their lower portions to side plates 53 and 51 respectively. A shaft 248 is rotatably journalled in side plates 246 and 247 at bearing assemblies 249 and 250 respectively. Fixedly connected to shaft 248 is a pair of crank arms 251 and 252 (FIGURE 14) which each extends forward to rotatably engage one of connecting arms 253 and 254, and which extends backward to engage one of tension-biasing helical springs 255. The other end of each of connecting arms 253 and 254 is rotatably attached to picker 233, and the other ends of springs 255 are attached to side plates 246, 247, by brackets 256. Also fixedly secured to shaft 248 is an L-shaped cam follower arm 257 (FIGURE 14) bearing a cam wheel 258. Arm 257 is tension-biased to bracket 256 by helical spring 259. Freely mounted on shaft 248 are a pair of cam follower arms 260 and 261, mounted by cylinders 262 and 263 respectively, and carrying follower wheels 264 and 265 respectively. Cylinders 262, 263, are free to rotate on shaft 248, and are axially restrained by fixed shaft discs 266 and 267.

Shaft 268 is rotationally journalled in side plates 246 and 247 at bearing assemblies 269 and 270 respectively. Fixedly attached to shaft 268 is a cam follower arm 269 with follower wheel 270. Also fixedly attached to shaft 268 is a pair of crank arms 271 and 272 which are rotationally connected respectively to a pair of connecting arms 273 and 274 which are in turn rotationally connected to slide members 243 and 244 respectively. Crank arms 271 and 273 are biased near their midpoints by helical tension springs 275 and 276 which are in turn secured to side plates 246 and 247 respectively.

Power shaft 277 is journalled in side plates 246 and 247 by bearing structures 278 and 279. A clutch 280 connects coaxial pulley 281 with shaft 277. Clutch 280 is selectively electrically actuatable to drive shaft 277 from pulley 281. Pulley 281 is driven via belt 282, from pulley 283 on idler shaft 284 journalled at bearings 285 and 286 between side plates 246 and 247. Idler shaft 284 is in turn driven at pulley 287 thereon from pulley 288 on idler shaft 46 (FIGURES 2 and 14) via belt 289. Idler shaft 46 is in turn driven from motor shaft 39 as already described. Fixed to shaft 277 is a picker actuating cam 290 which is contacted by follower wheel 258 of follower arm 257 so that shaft 248 is rotationally oscillated in response to the rotation of shaft 277. A pressure plate actuating cam 291 is fixed to shaft 277 and is contacted by follower wheel 270 of follower arm 269 so that shaft 268 is rotationally oscillated in response to the rotation of shaft 277. Fixed to shaft 277 is a pair of cams 292 and 293 which respectively are contacted by follower wheels 264 and 265 of follower arms 260 and 261. Three small position indicating cams 294, 295, and 296, are fixed to shaft 277, and cooperate with microswitches 297, 298, 299, through follower wheels 300, 301, and 302, all respectively, to indicate by the closed condition of one or the other of the switches 297, 298, 299, the angular position of shaft 277, and thus to indicate the position of picker 233 and pressure plate 231. Signals derived from switches 297, 298, 299, are utilizable for controlling the reader to synchronize with the hopper drive.

With more particular reference to FIGURES 17-21 inclusive, the input hopper itself includes a bracket 303 held to back-plate 230 at an L-shaped portion 304 by machine screws 307 (FIGURE 21) which are disposed in slots 308 in microswitch 306 so as to allow positioned adjustment thereof along the axis of slots 308. A feeler 309 communicates with a feeler axle 310 and is stabilized in the position of FIGURE 21 by a square portion 311 which sits on a platform 312, so that the remote end 309a thereof (FIGURES 17, 21) protrudes past innermost card 81a. Feeler 309 is biased into that position by the urging of yoke 313 which is pivoted through bracket 303 at pivot shaft 314 and is under tension from helical spring 315. A portion 310a of feeler axle 310 bears against the lower portion 316a of contact arm 316 such that counter-clockwise movement of the end 309a of feeler 309 (as viewed in FIGURE 21) past the position of card 81a causes counter-clockwise movement of contact arm 316 sufficient to close microswitch button 306a. Feeler 309a thereby acts as a sensitive spring balanced lever for contact arm 316 so that microswitch 306 may be actuated by the passage of card 81a downward past a lower lip 317 of back-plate 230 (FIGURE 17), yet with only a very light touch being applied to the face of card 81a. Between lower lip 317 and the main body of back-plate 230 is an aperture 318 through which an end 319a of a keeper spring 319 attached to back-plate 230 is disposed, so that card 81a is accurately guided between the edge 320a of bottom plate 320 and the adjacent face 317a of lower lip 317. The signal derived at microswitch 306 may be utilized to indicate the presence or absence of a card 81a at or approaching the "home" position between discs 63 and 84.

Figure 19:
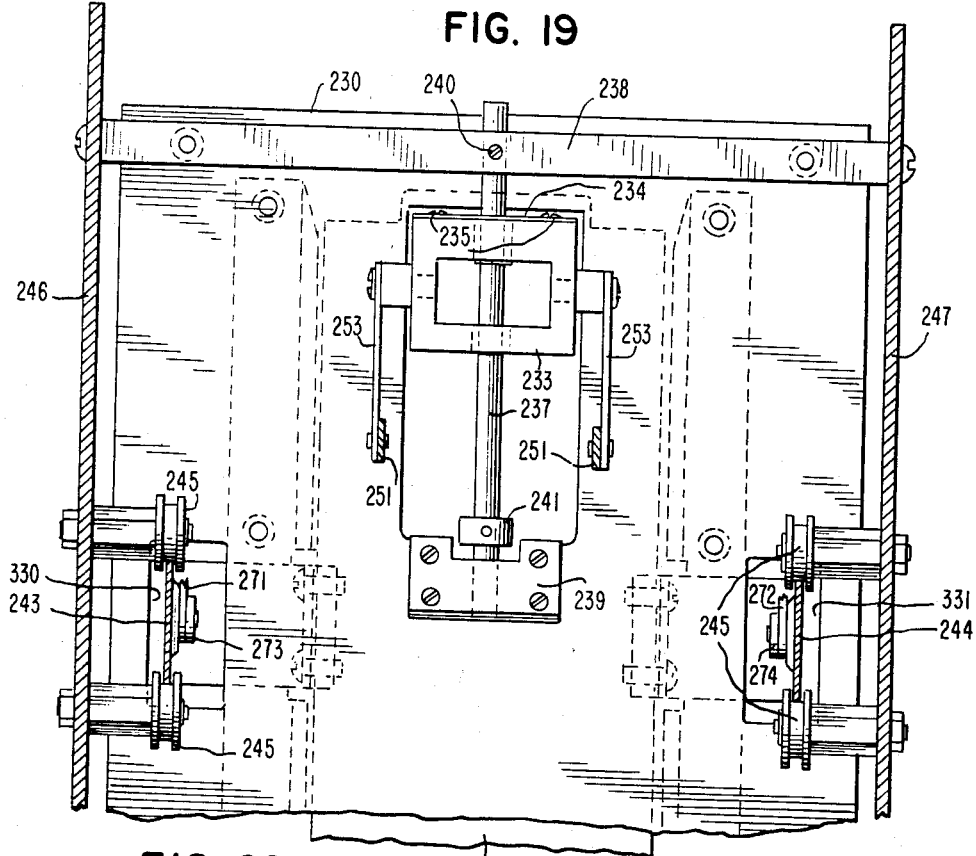
FIGURE 19 is a partial view taken along line 19—19 in FIGURE 17.
Figure 20:
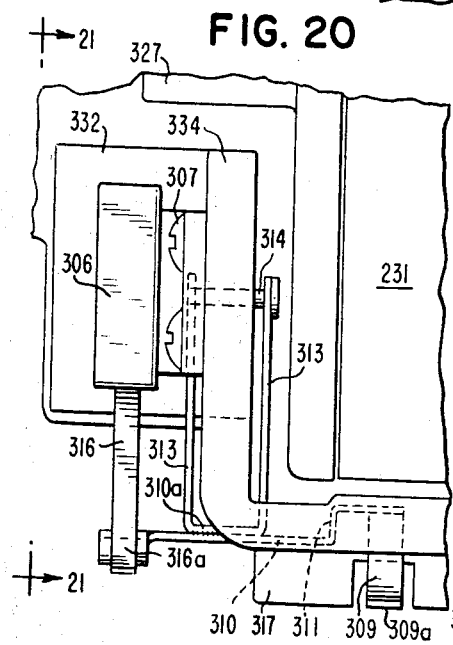
FIGURE 20 is a portion of the input hopper structure associated with the portion shown in FIGURE 19.
Figure 21:
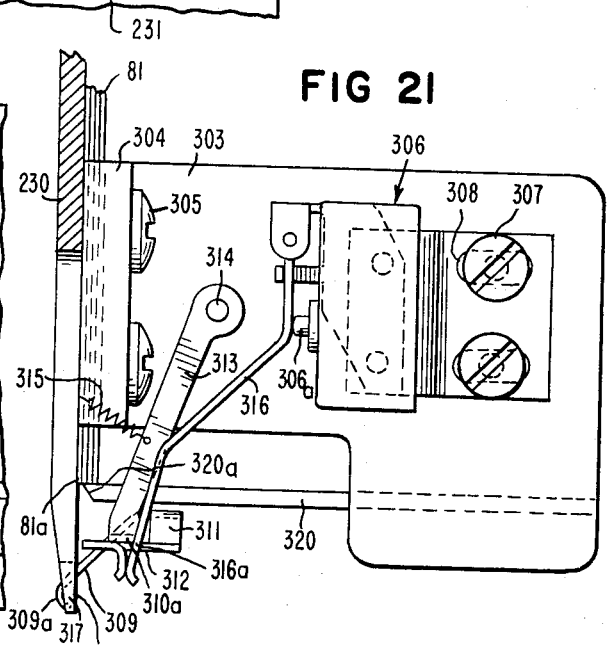
FIGURE 21 is a view of the structure shown in FIGURE 20 taken along line 21—21 therein.

As is best shown in FIGURES 16 and 19, back-plate 230 is secured to bracket extensions 321 on side plates 246 and 247 by machine screws 322, and side plates 246 and 247 are secured to side plates 53 and 51 by machine screws 323. Rollers 245 are bolted to side plates 246 and 247 and secured by nuts 324. Hopper side members 325 and 326 are secured to back-plate 230 at flanges 327 and 328 by machine screws 329. Slide members 243 and 244 pass through apertures 330 and 331 in back-plate 230, and extend outwardly past hopper side members 325 and 326 where they curve toward each other to be secured to pressure plate 231 by screws 242 as aforesaid. Bottom member 320 of hopper 32 is generally U-shaped, and is secured to back-plate 230 at flanges 332 and 333 of the arms 334 and 335 of bottom member 320 by machine screws 336.

Figure 14:
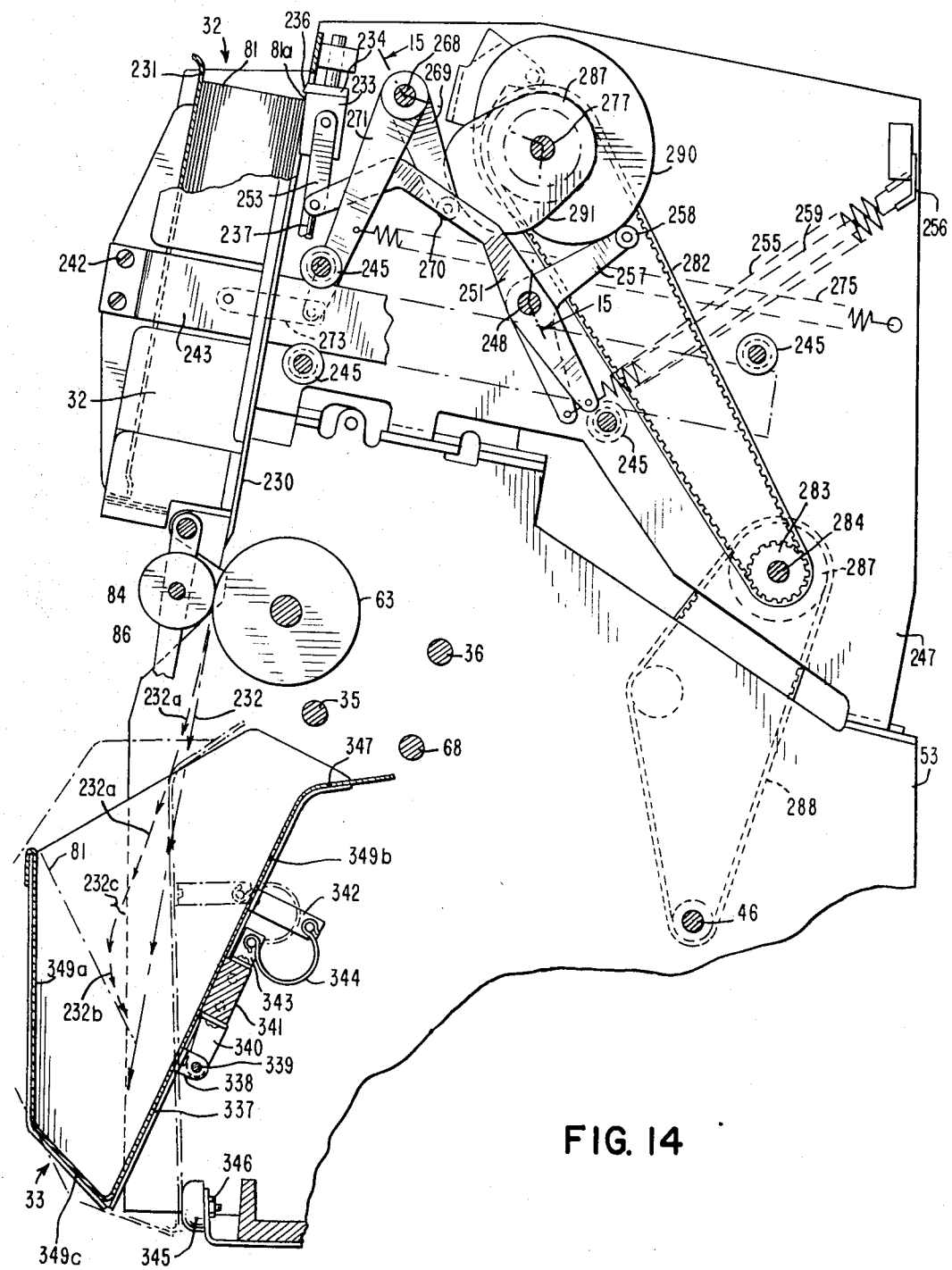
FIGURE 14 is a cross-sectional view of the tabulating card reader according to the invention showing the relationship of the various components associated with the input and output storage of the cards and the advancing of the cards therebetween.
Figure 15:
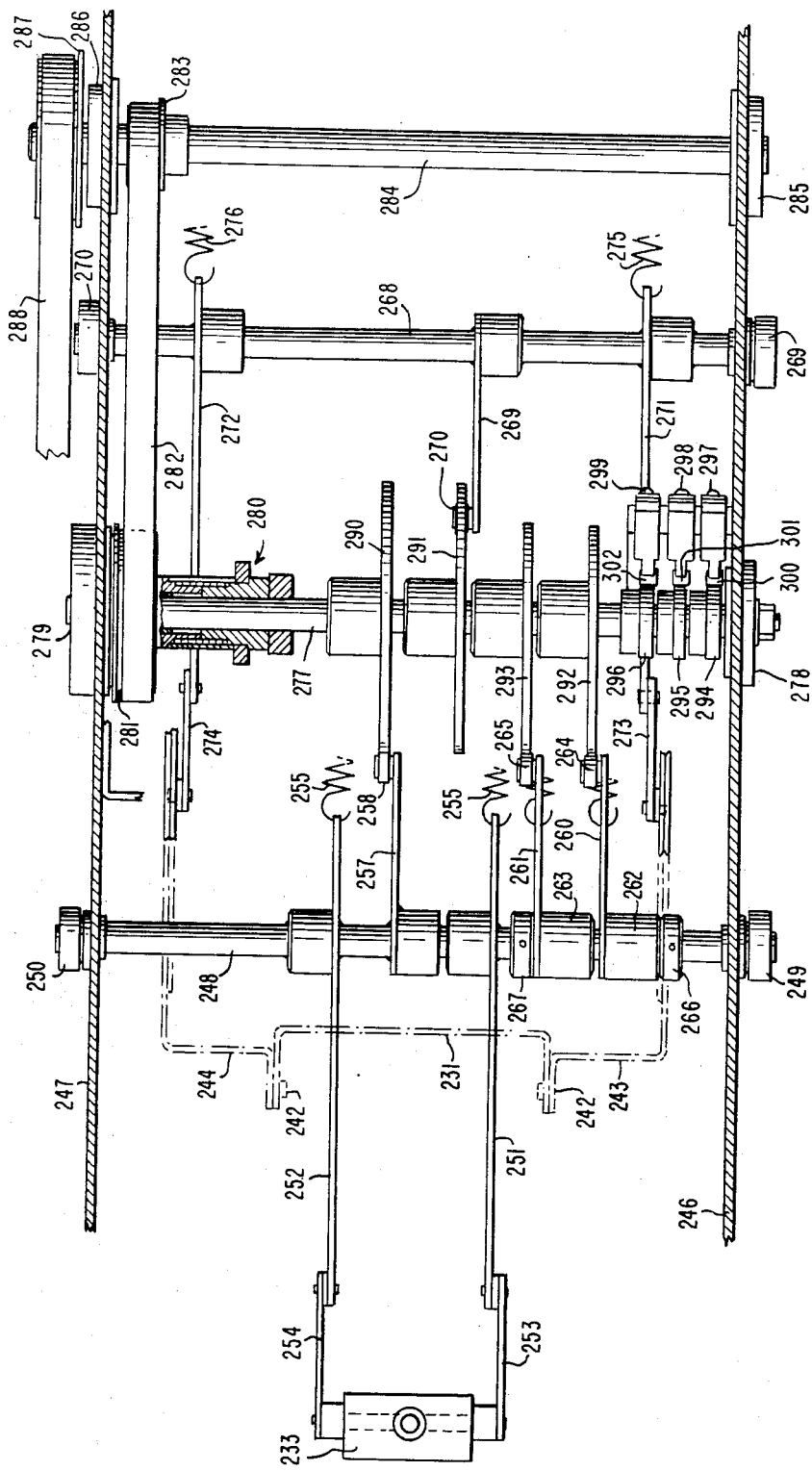
FIGURE 15 is a developed view of the driving mechanism for advancing the cards and taken along line 15—15 in FIGURE 14.

As is best shown in full outline in FIGURE 14, output hopper 33 includes a bin enclosure 337 for receiving and stacking cards 81, one at a time. The function of bin 337 is to selectively stack cards 81 either in the orginal order of input hopper 32, or in reverse order, depending upon the orientation of bin 337, as hereinafter explained.

Bin enclosure 337 is generally V-shaped as between the front bin panel 349a and the rear bin panel 349b. That is to say, panels 349a and 349b mutually define an acute angle. The approach of panels 349a and 349b is truncated by skewed panel 349c, which forms an obtuse angle with panel 349a and an acute angle with panel 349b. At the uppermost portion of rear bin panel 349b is a portion 347 slanted away from the enclosure of the bin, i.e. away from the space between panel 349a and panel 349b.

The bin enclosure 337 is pivoted at bracket 338 by pivot pin 339 to bracket 340 which is screwed to rail 341 extending between side plates 51 and 53. The bin 337 is thus pivotable between a first or "in" position shown in full outline in FIGURE 14, and a second or "out" position shown in phantom outline. The first or "in" position automatically causes stacking of the cards in the original order, while the second or "out" position automatically causes stacking of the cards in the reverse order. A bracket 342 on bin 337 cooperates with a bracket 343 on rail 341 to capture a horseshoe-shaped off-center spring 344, so that bin 337 is stable in only the two positions shown, any position off-center tending to the nearest of those two positions under the urging of the off-center spring 344. A stop cushion 345 is secured to the reader frame by nut 346, so as to quite pivoting toward the phantom outline position.

The bin panel 349a and the bin panel 349b are arranged relative to the pivoting mechanism just described, so that when bin 337 is in the first or "in" position shown in full outline, panel 349a is approximately vertical while panel 349b is slanted backward (relative to the front of the reader). When the bin 337 is pivoted to the second or "out" position shown in phantom outline, panel 349a is slanted forward and panel 349b is approximately vertical (preferably very slightly slanted forward, as shown).

The line of arrowheads 232 in FIGURE 14 indicates the free path of a card 81a. The length of each card 81a is such that rollers 63, 84, drive at positively a major portion of the way along the line 232, and only a minor portion of the way does the card free fall, after it has left the nip of rollers 63, 84. The line 232 also represents the path of the first few cards 81a driven into bin 337 when the bin is in the first or full outline position. It will readily be appreciated that the first card so driven will lie back against slanted rear panel 349b. Suceeding cards will lie, in order of arrival, atop this first card, so that the stack will be built up on rear panel 349b, in the original order of input hopper 32. As the stack grows in size, the incoming cards will be deflected by the stack, toward the bottom thereof, and the actual path will be deflected counter-clockwise slightly, at its lower portion, from the path 232 shown in FIGURE 14. The fact that rear panel 349b and bottom panel 349c make an acute angle, helps the bottom of the first card to run flush against rear panel 349b, but more importantly, it helps the bottom of the later cards, the latest of which may have been deflected somewhat by the pack as aforesaid, to run flush against the deck. This helps to create a tighter deck, and consequently obviates possibilities of shuffling of the cards by accident.

When the bin is placed in the second or "out" position shown in phantom outline, the cards are deflected from their free path. The pivoting mechanism of the bin is such that in this position the panel portion 347 is interposed into the free path 232 of cards 81a. Consequently each card 81a, still held by the nip of rollers 63, 84, is bent past portion 347 into the path shown at 232a. The early cards 81a arriving at bin 337 are curved along path 232a past panel portion 347 and then straight down into bin 337 where they lay, one atop another, on front panel 349a which is slanted forward. This causes a reverse order stacking of cards 81a. In other words, the early cards are deflected by panel portion 347, but after passing that portion they travel straight within the bin 337. A break line 232c is shown in phantom in arrow line 232a, and after the break the arrows are curved toward back panel 349b as at 232b. The change from a mode wherein path 232a is carried straight to the bottom of bin 337, to a mode wherein path 232a is carried up to the break line then curved into a path 232b, occurs after a stack of cards 81 (shown in phantom outline) has built up on front panel 349a. It is thus a feature of the device, that when the stack 81 in the output hopper has grown thick, additional cards can be accepted, automatically to obviate any crowded tendency to flip or flutter in the bin 337 and create stacking difficulties. Specifically, after a stack 81 has built up, each card is curved at 232b because of the stack 81 in its way, and when the upper end of that card is released at the nip of rollers 63, 84, the top of the card snaps over against the stack 81, i.e. the top of the card follows the bottom thereof down along the stack 81. Thus, the arrangement is such that even with a large stack, the later cards are automatically assured of being correctly stacked.

In general, the V-shaped bin 337 allows stacking of the cards at output hopper 33 in the original or the reverse positions, depending upon the orientation of bin 337. The truncated bottom 349c and the deflecting portion 347 serve to orient the incoming cards so that tight, correctly sequenced, stacks of cards are assembled without difficulties.

The operation of the tabulating card reader will now be considered with reference to the various components already described. For purposes of clarity the sequence will be traced through a single element whenever like operations are carried out by duplicate elements. Thus in addition to other elements, the description will proceed with respect to one card, designated 81a as aforesaid, one program ring 180 on program drum 38 (or, in the unitary form, one circumferential row of teeth 180c), one star wheel bell crank 123, its associated interposer 130, the associated contact actuating lever 148, and the set of contact subassemblies 155 and 156 actuated by the latter. It will, however, be understood that the described operation of these components applies in all respects to the operation of other similar components in the reader.

Assume at the outset that the reader stands ready to perform a tabulating card reading operation. The operator will place a deck of cards 81 into the input hopper 32 and will tilt bin 337 of output hopper 33 to the position shown in full outline in FIGURE 14, assuming he wants the output hopper 33 cards stacked in the order they occupied in input hopper 38. When breakable teeth 180c are employed, the operator may or may not operate upon teeth 180c (i.e., break some away) so as to cause certain functions to occur within the reader, as will be more fully described below. When non-breakable, i.e. detachable and replaceable, teeth 180c are employed, the operator similarly will initially decide what if any teeth are to be removed to cause these same functions. One such function is "skipping" (i.e., high speed driving of card 81a through the reading station without reading) of certain parts of all or certain cards. Assuming that "skipping" is to be programmed into drum 38, and that breakable tooth program rings 180 are employed, the operator will initially remove a certain one of program rings 180 associated with a certain contact subassembly 211 and will (by pliers or otherwise) remove those teeth that correspond to the index-point columns that are to be skipped on the card. The operator may also remove teeth on rings, other than the "skipping" function ring, e.g., the subject ring of this description, depending upon what other functions are to be controlled during a given reading sequence. The procedure is the same when the teeth 180c are on a unitary structure (rather than on separate rings) and/or when detachable (rather than breakable) teeth 180c are employed, except that, the teeth are removed rather than broken off.

Assuming that motor 34 has been energized and that clutch 280 has been initially energized and engaged by the operator's manipulation of front panel controls 31a, the card feeding sequence is begun. Shaft 277 will accept power from belt 282 via pulley 281 and clutch 280, and will thereby operate both picker 233 and pressure plate 231. The position of picker actuating cam 290 when the picker 233 is at the top of its scope of movement, and the position of pressure plate actuating cam 291 when the pressure plate 231 is at its most outward position (i.e., when input hopper 32 defines the greatest internal volume), are both illustrated in FIGURE 14. When shaft 277 and cam 290 are rotated, shaft 248 is reciprocally rotated via cam follower arm 257 with roller 258, and the initial effect is to rotate shaft 248 in a counter-clockwise sense( as viewed in FIGURE 14) under the urging of springs 255, 259, so that crank arms 251, 252 are also pivoted counter-clockwise on shaft 248, thus driving the picker 233 downward to pick a card. Simultaneously with this operation of picker 233 via cranks 251, 252, the cam 291 causes cam follower 269 to initially rotate in a counter-clockwise direction, thus causing crank arms 271, 272, under the urging of spring 275 to draw pressure plate 231 toward the right as viewed in FIGURE 14. The coordinated pressuring of the cards 81 by pressure plate 231 and the downward movement of picker 233 ensures that knife edge 236 will pick a card, and only one card, on each downward pass. This is an important feature in the reliability of the device. Preferably after the initial 180° rotation of cams 290 and 291, picker 233 begins its travel back up to the initial position shown in FIGURE 14, and pressure plate 231 moves leftward taking pressure off cards 81. During the rotation of shaft 277 this cycle is repeated, each cycle constituting the feed of a single card 81a (FIGURES 17, 18) to the reading station. By means of position sensing cams 294, 295, 296, and associated switches 297, 298, 299, the position of shaft 277 is monitored and clutch 280 is disengaged only when the picker 233 and pressure plate 231 are in the positions shown in FIGURE 14, i.e. at the position prior to commencement of a new picking cycle. At that point cards 81 are loose (if the input hopper 32 is not full) and cards can be added by hand.

It is an important feature of the invention that the card 81a is positively driven endwise downward a fraction of its length by picker 233 until the lower end of the card reaches stop portion 82 (FIGURE 18) of card driving discs 63 on main feed roll 62. Another important feature of the reliability of the device is that the card 81a is positively pressured by pressure plate 231 while being positively driven by picker 233, but that it is not entirely removed from input hopper 32 prior to pick-up at driving discs 63. Rather, the card remains under the coordinated control of both the input hopper 32 parts and the driving discs 63 during reading. Thus, when the discs 63 intercept and begin to drive the card 81a, the pressure plate 231 is already in its pressure releasing phase and the card may be drawn further downward without slippage. However, during this takeover by discs 63 the upper portion of the card nevertheless remains slidably secured by backplate 230, keeper spring 319, and edge 320a of bottom plate 320. This careful phasing of control of the progress of card 81 from the powered parts of hopper 32 (picker 233, pressure plate 231) to a combination of the powered parts at the reading station (discs 63) in conjunction with the passive parts at the hopper 32 (plate 230, plate 320, spring 319) assures that the progress of the card will be sure and synchronized and without jamming and the like. It is essential that the card 81a be pressured by plate 231 during at least a major portion of the distance it is driven by picker 233, and it is preferable that it be pressured until the aforesaid pickup thereof by discs 63.

The tabulating card 81a also may be inserted into the reading station since the previous card reading operation terminated with the pressure roll discs 84 spaced from the discs 63 of the main feed roll 62 by reason of the fact that the pressure roll 83 was latched in spaced position by latched engagement to its supporting arms 86 and 87 with the latch arms 95. The area of the tabulating card 81a between its leading end and its first index-point column is conventionally non-perforated so that two adjacent teeth of the star wheel 122 engage the rear surface of the card and position the bell cranks 123 with their latch portions 129 raised into latching relation to their associated interposers 130. This is also the position of the components last mentioned when, during the card reading operation, a star wheel senses the absence of a code aperture in the card.

The card reading operation of the reader is preceded by energization of the pressure-roll latch-rolls electromagnets 100, which thereupon attract the armature strap 99 to rotate the latch bail arms 95 against the bias of their springs 98, and unlatch the pressure-roll support arms 86 and 87. The latter, under bias of the springs 103, move the pressure-roll 83 to engage its discs 84 with the front surface of the card and thereby press the latter into engagement with the discs 63 of the main feed roll 62. This movement of the support arms 86 and 87 actuates the electrical contacts 106 to closed-contact position to signify engagement of the pressure-roll with the tabulating card.

The reader operation is now initiated by energization of the electromagnet 223 of the read-speed clutch 54 mechanically to couple the power drive pully 49 to the read-speed driven shaft 36. Assuming that the energization of the read-speed clutch electromagnet 54 is of brief duration, the read-speed driven shaft 36 rotates 90 angular degrees where it halts by reason of the fact that the read-speed clutch 54 interrupts the mechanical connection between the shaft 36 and the drive pully 49.

This angular movement of the read-speed shaft 36 is accomplished by corresponding angular movements of the cams 141 and 147. This angular movement is initiated with the cam follower 138 resting upon the intermediate step of the cam 141 as illustrated in FIGURE 10, so that counter-clockwise rotation of the cam 141 (as indicated by the directional arrow) acts to bring the lowest step of the cam 141 beneath the cam follower 138. This produces clockwise rotation of the bell cranks 136 and bail 135. The interposer 130 follows this motion of the bail 135, under bias of the interposer spring 133, until the end of the interposer engages the now-raised latch portion 129 of the star wheel bell crank 123 (the star wheel 122 at this same time senses the absence of a code aperture in the tabulating card 81a). Upon engagement of the interposer 130 with the latch portion 129, the forward movement of the interposer is halted and this occurs before its right-hand end (as seen in FIGURE 10) can move out from beneath the lower end of the associated contact actuator 148. The bail 135 continues to move forwardly, and in doing so moves out of engagement with the interposer 130, until the cam follower 138 rests upon the lowest step of the cam 141. As the cam 141 continues its counter-clockwise rotation, its highest step lobe is brought under the cam follower 138 to rotate the bell cranks 136 and bail 135 in counter-clockwise direction. The bail 135, previously withdrawn from contact with the portion 132 of the interposer 130, eventually returns into engagement with the interposer and moves the interposer to the right (as seen in FIGURE 10) so that the right-hand end of the interposer is moved further beneath the lower end of the contact actuator lever 148. Additional rotation of the cam 141 retains the bail 135 in counter-clockwise rotated position until near the end of the 90 degree angular rotation of the read-speed driven shaft 36, at which time the intermediate step of the cam 141 moves beneath the cam follower 138 to produce a small angular clockwise rotation of the crank arms 136 and bail 135. This partially withdraws the interposer 130 from beneath the lower end of the contact actuator lever 148. As this occurs, the cam 147 moves one of its lobes beneath the cam follower 145 to rotate the arms 143 and unlatch bail 142 counter-clockwise into engagement with the interposers 130. Such engagement serves no function under the prevailing operational conditions here considered. The 90 degree angular rotation of the read-speed shaft 36 ends with the cam follower 138 again resting on the intermediate step of the cam 141 and with the cam follower 145 centered upon a lobe of the cam 147.

While all the foregoing interposer drive actuations are taking place, the angular movement of the read-speed shaft 36 rotates the drive roll 62 through the already described interconnecting gearing. Specifically, this first 90 degree angular rotation of the read-speed shaft 36 causes the drive roll 62 to rotate through a small angle sufficient to advance the card to a position where its first index-point column is sensed for code apertures by the star wheels 122. Assume that a star wheel 122 senses a code aperture upon advance of the card. The rotational motion of the drive roll 62 terminates with a tooth of the star wheel 122 projecting through the code aperture. That is to say, the star wheel 122 shown in FIGURE 10, moves slightly to the left as viewed therein by virtue of the fact that one of the teeth of the star wheel passes through an aperture of card 81a. This causes the star wheel bell crank 123 to rotate clockwise bringing its latch portion 129 below the associated interposer 130. The latch portion 129 is in this position at a controllable-halt position of the read-speed shaft 36 when the electromagnet 223 of the clutch 54 can once more be briefly energized mechanically to couple the read-speed shaft 366 to the drive pully 49 for a further 90 degree angular rotation of the shaft. Assume that the clutch electromagnet is so energized. Now as the cam 141 begins to rotate in the counter-clockwise direction, the cam follower 138 remains on the intermediate step of the cam for the first 2 degrees of cam rotation, and thereafter begins to drop onto the lower step of the cam. As it does so, the bail 135 moves clockwise as earlier explained and is followed in this motion by the interposer 130. Had the latch portion 129 of the bell crank 123 been in elevated position as in the operating condition first described, the end of the interposer 130 would have engaged the latch portion 129 after 6 degrees of rotation of the cam 141. Under the condition here assumed, that is with a perforation sensed, the latch portion 129 is in lowered position and accordingly the interposer 130 moves over the latch portion 129 as the interposer continues to follow the rotational motion of the bail 135.

At 10 degrees of rotation of the cam 141, the right-hand end of the interposer 130 moves from beneath the lower end of its associated contact actuator lever 148. In the meantime, rotation of the cam 147 causes its lobe to move out from beneath the cam follower 145 to rotate the arms 143 and latch bail 142 away from the interposers. Thus when the right-hand end of the interposer 130 moves out from beneath the end of the actuating lever 148, the interposer is free to pivot about its engagement with the bail 135 under bias of the spring 133. This pivotal motion of the interposer 130 is terminated when the interposer engages the unlatch bail 142. The bail 135 continues its clockwise rotation to 19 degrees of rotation of the cam 141, at which time the unlatched bail 142 has been rotated to its maximum clockwise position, and thereafter the highest step of the cam 141 begins to move beneath the cam follower 138 to initiate counter-clockwise rotation of the crank arms 136 and bail 135.

At approximately 26 degrees of the angular rotation of the cam 141, the interposer 130 in pivoted position is moved by the bail 135 into engagement with the lower end of the contact actuator lever 148. Further counter-clockwise rotation of the bail 135 moves the interposer 130 to the right and drives the contact actuator lever 148 counter-clockwise through its engagement with the interposer 130. The contact actuator lever 148 opens the contacts of the contact subassembly 155 and closes those of the subassembly 156 between 40 degrees and 75 degrees of rotation of the cam 141.

At 29 degrees of rotation of the cam 141, the left-hand end of the interposer 130 clears the end of the latch portion 129 of the star wheel bell crank 123. Previous to this time, the read-speed driven shaft 36 had begun the rotation of the drive roll 62 to advance the tabulating card to its next index-point column. The interposer 130, having thus cleared the end of the latch portion 129, permits the star wheel bell crank 123 to rotate counter-clockwise should its star wheel 122 sense an absence of a code aperture in the next index-point column of the card. If the absence of a code aperture is so sensed, the resulting counter-clockwise rotation of the star wheel bell crank 123 arrives at the mid-range of its motion at approximately 51 degrees of rotation of the driven read-speed shaft 36 and is completed upon completion of the 90 degree angular rotation of the read-speed shaft 36. Had the star wheel found a code aperture in the next index-point column of the card, the star wheel bell crank would have remained in its full clockwise rotated position.

At 70 degrees of rotation of the read-speed shaft 36, the cam 147 begins to move a lobe beneath the cam follower 145 and depresses the unlatched bail 142. The latter ultimately depresses all of the interposers 130 beneath the ends of their associated contact actuating arms 148 to allow the actuating arms 148 to return under bias of their springs 167 into engagement with the stop bar 169. This again closes the contacts of the contact subassembly 155 and opens the contacts of the contact subassembly 156.

At 75 degrees of rotation of the cam 141, the cam follower 138 begins to drop onto the intermediate step of this cam and reaches the step at approximately 88 degrees of the cam rotation. The cam follower arm 145 reaches the peak of a lobe of the cam 147 also at approximately 88 degrees of cam rotation.

During the 90 degree angular rotation of the read-speed shaft 36 last considered, one of the cams 113 (FIGURE 5) has actuated a corresponding set of contacts 121 to colsed-contact position at approximately 41 degrees of angular rotation of the cam, and the contacts are maintained colsed until approximately 74 degrees of cam rotation. It is through these contacts that the contacts of the contact subassemblies 155 and 156 are energized to derive the output coded electrical signals representative of the coded information read from each index-point column of the tabualting card. The contacts of the contact assembly 121 close after positioning of the contacts of the subassemblies 155 and 156 and open just before repositioning of the contacts of the latter.

The standard tabulating card records a maximum of 80 alpha-numeric characters, symbols, or functional control items of information by use of 80 index-point columns of the card. After reading the last index-point column of the card, the next several 90 degree angular rotations of the read-speed shaft 36 engage the segmental gears 90 and 91 on the main feed roll 62 with the one-tooth segmental gears 93 and 94 provided on the pressure roll 83 and cause these engaged gear elements to move the pressure roll 93 to position where its support arms 86 and 87 are latched by the latch arms 95. Upon separation of the pressure roll 93 from the main feed roll 62, the tabulating card 81, which has been driven partway into output hopper 33, drops under gravity the rest of the way along one of the paths already described, depending upon the position of bin 337, as illustrated in FIGURE 14. The next several 90 degree rotations of the driven shaft 23 move the main feed roll 62 to its "home" position where the feeler shaft 110 (FIGURE 22) enters the notch 109 of the cam 108 to bring the tabulating card reading operation to a halt subject to delivery of another card 81a to the reading position by the input hopper card drive mechanism.

During the read-speed opertaion already described, the shaft 64 which bears the main drive roll 62 will of course have been rotating at a read-speed rate. Program drum 38, being mounted in common with shaft 64, is thereby adapted to rotate at the same rate as main drive roll 62, and consequently during the read-speed operation of the reader, the program drum 38 is also rotated at the read-speed rate. Since the operator will have aligned the drum 38 with teeth 180c with reference to the pointer 229 so that the index-point columns of a card are exactly coordinated to the numerals appearing on the index plate 183, it follows that as program drum 38 revolves with main drive roll 62, the index-point columns which are driven into reading position by main drive roll 62 will exactly correspond to the index-point columns indicated on index plate 183. By so aligning the drum 38 and teeth 180c, the operator is enabled to remove and bring into exact alignment teeth 180c corresponding to predetermined index-points on the actual card as it is read thereafter.

The program drum 38 is susceptible to use for controlling a wide variety of functions in the reader. Since a separate contact assembly 217a, 218a, exists for every program ring, it is clear that, if desired, a signal may be derived for any single missing tooth on any ring 180, which is to say a separate signal may be derived for any index-point on card 81a. This clearly allows employing such individually derivable signals for causing any information read at any index-point or groups of index-points to be blanked out, or to be supplemented by other information represented by the signal derived at contacts 217a, 218a, or for any one of a multiplicity of other possibilities limited only by the desires of the operator. It is also clearly possible to utilize the signals derivable at each pair of contacts 217a, 218a, only when some exterior event occurs. For example, it can be arranged so that the signal derivable at one or more pairs of contacts 217a, 218a, is not employed for whatever function it controls unless one of control switches 34 on the reader has first been energized. For another example, the signals derivable at one or more pairs of contacts 217a, 218a, can be rendered inoperative to control whatever function those controls have been assigned to control unless and until a certain information item is read on the card 81 being then scrutinized by the reader. It may be seen that, subject only to the connections to which the multiplicity of contacts 217a, 218a, is put, various functions in the reader may be controlled either for every card or selectively for some cards or no cards, and that furthermore since every index-point corresponds to a predetermined tooth 180c extreme flexibility of control is afforded.

One important function which such a program drum 38 can be adapted to control is known as "card skipping." It is contemplated that a programmer will assign a single program ring 180 (or, with a unitary structure, a single circumferential row of teeth 180c) to control the card skipping function. Assuming that the programmer desires to skip for example index columns 10 through 40 inclusive on every card which enters the reader from the input hopper 32, he will remove the teeth 180c between the numeral positions 10 through 40 inclusive on one of rings 180 (or circumferential rows of teeth) which constitutes the "skipping" program ring (or row). A single pair of contacts 217a, 218a, will be actuated by the position of the associated roller 221 on the ring 180 constituting the "skipping" program ring (or the row of teeth in a unitary structure). During the reading of a card, the program drum 38 will rotate such that the pointer 229 indicates traverse of the 80 columns on the card then under reading. When the card 81a has been driven by main drive roll 62 to the tenth index column, the tenth tooth 180c will at that time come under roller 221, and contacts 217a, 218a, will be closed by virtue of roller 221 dropping into the space vacated by the absent tooth corresponding to the tenth index-point on the skip function program ring. The signal derived at now-closed contacts 217a, 218a, is employed to de-energize electromagnet 223 thereby disengaging read clutch 54 and to energize electromagnet 224 thereby engaging high speed clutch 59. Power is thereby removed from read-speed shaft 36 and is completed to high skip speed shaft 35, resulting, through the gearing already described, in a greatly increased rate of drive of shaft 64. Main drive roll 62 thereon is thereby driven at a greatly increased rate so that card 81a progresses through the reader at a rate of speed several times the normal reading rate of speed. While shaft 64 with main drive roll 62 thereon is rotating at this high rate of speed program drum 38 is of course rotating at the same rate of speed. So long as the portion of program drum 38 falling under the roller 221 associated with the skip function program ring (or row, as aforesaid) bears missing teeth 180c the high rate of speed of main drive roll 62 will continue. As soon as, in the example given, the tooth 180c coresponding to the 40th index-point in the column associated with the skip function program ring (or row, as aforesaid) appears beneath roller 221, the next increment of rotation of program drum 38 will push roller 221 leftward (as viewed in FIGURE 12) and contacts 217a, 218a, associated therewith will be once again opened. The opening of these contacts will de-energize high speed clutch 59 and re-energize low speed clutch 54, so that reading of index-point columns 41 et seq. is reinstituted. All the while high skip speed shaft 35 was doing the driving, read speed shaft 36 and consequently cams 141, 147, thereon, was immobile. Thus the entire set of reading elements was out of action, and as already explained, must therefore be correctly aligned with the next index-point column to be read. This is an important feature. A card reader must be very precise in positioning, so that the correct information is derived. Only when such precision of reading positioning is preserved, can a skipping alternative mode be feasible.

Any number of index-point columns may be skipped by taking advantage of this programming feature just described, and when all 80 index-point columns are skipped, the entire card is of course passed through the reader at high speed without any information being read at all. As previously mentioned, one or more parts of a card may be skipped, and the part of parts which are skipped may be large or small. Moreover, different parts may be skipped on different cards, depending either upon manual selection as certain cards pass through the reader or depending upon automatic selection such as by certain information appearing or not appearing in the first one or several index-point columns of that card or by other means.

While a specific form of the invention has been described for purposes of illustration, it is contemplated that numerous changes may be made without departing from the spirit of the invention.

What is claimed is:

1. Apparatus for feeding tabulating cards including an end corresponding to a first dimension thereof and an edge corresponding to a second dimension thereof one at a time and endwise from a deck of such cards comprising means defining a hopper for receiving and holding said deck of cards between a back portion and a front portion of the hopper; pressuring means located at said front portion of the hopper for reciprocal motion toward and away from said hopper back portion so as to apply and release pressure from said deck of cards therebetween; picker means located at the back portion of said hopper and including a portion thereof adapted to engage an end of the rearmost card only of said deck of cards; guide means for guiding said picker means for reciprocal motion between a first position adjacent a mutual end of said deck of cards and a second position a portion of the way along said deck of cards; and means for coordinating the reciprocal actions of said pressuring means and said picker means so that said deck of cards is under pressure during movement of said picker means from said first position at least a major portion of the way toward said second position.

2. Apparatus for feeding tabulating cards of rectangular configuration including an end corresponding to the width thereof and an edge corresponding to the length thereof one at a time and endwise from a deck of such cards comprising means defining a hopper for receiving and holding said deck of cards between a back portion and a front portion of the hopper; pressuring means located at said front portion of the hopper for reciprocal motion toward and away from said hopper back portion so as to apply and release pressure upon said deck of cards therebetween; picker means located at the back portion of said hopper and including a portion thereof adapted to engage an end of the rearmost card only of said deck of cards; guide means for guiding said picker means for reciprocal motion between a first position adjacent a mutual end of said deck of cards and a second position a portion of the way along said deck of cards; and means for coordinating the reciprocal actions of said pressuring means and said picker means so that said deck of cards is under pressure during at least a major portion of the movement of said picker means from said first to said second positions but not from said second to said first poitions.

3. Apparatus for feeding tabulating cards of rectangular configuration including an end corresponding to the width thereof and an edge corresponding to the length thereof one at a time and endwise from a deck of such cards comprising means defining a hopper for receiving and holding said deck of cards between a back portion and a front portion of the hopper; pressuring means located at said front portion of the hopper for reciprocal motion toward and away from said hopper back portion so as to apply and release pressure upon said deck of cards therebetween; guide means located at the back portion of said hopper and extending in the direction of feed of said deck of cards; picker means mounted on said guide means for reciprocal motion therealong between first and second extreme positions, said picker means including a portion adapted for driving engagement with an end of the rearmost card only of said deck of cards, said first position being adjacent a mutual end of said deck of cards and said second position being a portion of the way along said deck of cards in the direction of feed; first drive means for driving said picker means from said first to second positions and return; second drive means for driving said pressuring means from the front toward the rear of said hopper and return; and means for coordinating the reciprocal actions of said pressuring means and picker means so that said deck of cards is under pressure during movement of said picker means from said first position at least a major portion of the way toward said second position.

4. Apparatus for feeding tabulating cards of rectangular configuration including an end corresponding to the width thereof and an edge corresponding to the length thereof one at a time and endwise from a deck of such cards comprising means defining a hopper for receiving and holding said deck of cards between a back portion and a front portion of the hoppers; pressuring means located at said front portion of the hopper for reciprocal motion toward and away from said hopper back portion so as to apply and release pressure upon said deck of cards therebetween; guide means located at the back portion of said hopper and extending in the direction of feed of said deck of cards; picker means mounted on said guide means for reciprocal motion therealong between first and second extreme positions, said picker means including a portion adapted for driving engagement with an end of the rearmost card only of said deck of cards; said first position being adjacent a mutual end of said deck of cards and said second position being a portion of the way along said deck of cards; first drive means for driving said picker means from said first to second positions and return; second drive means for driving said pressuring means from the front toward the rear of said hopper and return; and means for coordinating the reciprocal actions of said pressuring means and picker means so that said deck of cards is under pressure during movement of said picker means from said first position to said second position.

5. Apparatus for feeding tabulating cards of rectangular configuration including an opposed pair of ends corresponding to the width thereof and an opposed pair of edges corresponding to the length thereof one at a time and endwise from a deck of such cards comprising means defining a hopper for receiving and holding said deck of cards between a back portion and a front portion of the hopper; pressuring means located at said front portion of the hopper for reciprocal motion toward and away from said hopper back portion so as to apply and release pressure upon said deck of cards therebetween; picker means located at the back portion of said hopper and including a portion thereof adapted to engage one of said ends of the rearmost card only of said deck of cards; guide means for guiding said picker means for reciprocal motion between a first position adjacent a mutual end of said deck of cards and a second position a portion of the way along the length of said deck of cards; and means for coordinating the reciprocal actions of said pressuring means and said picker means so that said deck of cards is under pressure during movement of said picker means from said first position at least a major portion of the way toward said second poistion.

6. Apparatus for feeding tabulating cards of rectangular configuration including an opposed pair of ends corresponding to the width thereof and an opposed pair of edges corresponding to the length thereof one at a time and endwise from a deck of such cards comprising means defining a hopper for receiving and holding said deck of cards between a back portion and a front portion of the hopper; pressuring means located at said front portion of the hopper for reciprocal motion toward and away from said hopper back portion so as to apply and release pressure upon said deck of cards therebetween; picker means located at the back portion of said hopper and including a portion thereof adapted to engage one of said ends of the rearmost card only of said deck of cards; guide means for guiding said picker means for reciprocal motion between a first position adjacent a mutual end of said deck of cards and a second position a portion of the way along the length of said deck of cards; and means for coordinating the reciprocal actions of said pressuring means and said picker means so that said deck of cards is under pressure during movement of said picker means from said first to said second positions but not from said second to said first positions.

7. Apparatus for feeding tabulating cards including an opposed pair of ends corresponding to a first dimension thereof and an opposed pair of edges corresponding to a second dimension thereof one at a time and endwise from a deck of such cards comprising means defining a hopper for receiving and holding said deck of cards between a back portion and a front portion of the hopper; pressuring means located at said front portion of the hopper for reciprocal motion toward and away from said hopper back portion so as to apply and release pressure upon said deck of cards therebetween; guide means located at the back portion of said hopper and extending in the direction of feed of said deck of cards; picker means mounted on said guide means for reciprocal motion therealong between first and second extreme positions, said picker means including a portion adapted for driving engagement with an end of the rearmost card only of said deck of cards, said first position being adjacent a mutual end of said deck of cards and said second position being a portion of the way along the said second dimension of said deck of cards; first drive means for driving said picker means from said first to second positions and return; second drive mean for driving said pressuring means from the front toward the rear of said hopper and return; and means for coordinating the reciprocal actions of said pressuring means and picker means so that said deck of cards is under pressure during movement of said picker means from said first position at least a major portion of the way toward said second position.

8. Apparatus for feeding tabulatng cards of rectangular configuration including an end corresponding to the width thereof and an edge corresponding to the length thereof one at a time and endwise from a deck of such cards comprising means defining a hopper for receiving and holding said deck of cards between a back portion and a front portion of the hopper; pressuring means located at said front portion of the hopper for reciprocal motion toward and away from said hopper back portion so as to apply and release pressure upon said deck of cards therebetween; guide means located at the back portion of said hopper and extending in the direction of feed of said deck of cards; picker means mounted on said guide means for reciprocal motion therealong between first and second extreme positions, said picker means including a knife-edge for engagement with said end of the rearmost card only of said deck of cards, said first position being adjacent a mutual end of said deck of cards and said second position being a portion of the way along the length of said deck of cards in the direction of feed; first drive means for driving said picker means from said first to second positions and return; second drive means for driving said pressuring means from the front toward the rear of said hopper and return; and means for coordinating the reciprocal actions of said pressuring means and picker means so that said deck of cards is under pressure during movement of said picker means from said first position to said second position.

9. Apparatus for feeding tabulating cards of rectangular configuration including a pair of opposed ends corresponding to the width thereof and a pair of opposed edges corresponding to the length thereof one at a time and endwise from a deck of such cards to means at a reading zone for accepting and drawing said cards in turn farther on, comprising a hopper adapted to receive and hold said deck of cards between a back portion and a front portion thereof, said back portion comprising a planar surface supportive of said cards and including means defining a card exit adjacent an edge of said back portion adapted to accommodate one of said first edges of the rearmost card in said deck of cards; pressuring means located at said front portion of the hopper for reciprocal motion toward and away from said hopper back portion so as to apply and release pressure upon said deck of cards therebetween; picker means located adjacent the back portion of said hopper and including a portion thereof adapted to engage the other of said ends of the rearmost card only of said deck of cards; guide means for guiding said picker means for reciprocal motion between a first position adjacent the mutual other of said ends of said deck of cards and a second position a portion of the way along the length of said deck of cards essentially equal to the length from said card exit to said means at the reading zone; and means for coordinating the reciprocal actions of said pressuring means and said picker means so that said deck of cards is under pressure during movement of said picker means from said first position at least a major portion of the way toward said second position.

10. Apparatus for feeding tabulating cards of rectangular configuration including a pair of opposed ends corresponding to the width thereof and a pair of opposed edges corresponding to the length thereof one at a time and endwise from a deck of such cards to means at a reading zone for accepting and drawing said cards in turn farther on, comprising a hopper adapted to receive and hold said deck of cards between a back portion and a front portion thereof, said back portion comprising a planar surface supportive of said cards and including means defining a card exit adjacent an end of said back portion adapted to accommodate one of said ends of the rearmost card in said deck of cards; pressuring means located at said front portion of the hopper for reciprocal motion toward and away from said hopper back portion so as to apply and release pressure upon said deck of cards therebetween; guide means located at the back portion of said hopper and extending in the direction of the length of said deck of cards; picker means mounted on said guide means for reciprocal motion therealong between first and second extreme positions, said picker means including a portion adapted for engagement with the other of said ends of the rearmost card only of said deck of cards, said first position being adjacent the mutual other of said ends of said deck of cards and said second position being intermediate said ends of said deck of cards and along said guide means a distance essentially equal to the length from said card exit to said means at the reading zone; first drive means for driving said picker means from said first to second positions and return; second drive means for driving said pressuring means from the front toward the rear of said hopper and return; and means for coordinating the reciprocal actions of said pressuring means and picker means so that said deck of cards is under pressure during movement of said picker means from said first position to said second position.

11. Apparatus for feeding tabulating cards of rectangular configuration including a pair of opposed ends corresponding to the width thereof and a pair of opposed edges corresponding to the length thereof one at a time and endwise from a deck of such cards to means at a reading zone for accepting and drawing said cards in turn farther on, comprising a hopper adapted to receive and hold said deck of cards on a bottom portion thereof and between a back portion and a front portion thereof, said back portion comprising a planar surface essentially coextensive with the length and width of said cards and including means defining a card exit adjacent an end of said back portion adapted to accommodate one of said ends of the rearmost card in said deck of cards; a pressure plate located at said front portion of the hopper and coplanar with the frontmost card in said deck of cards for reciprocal motion toward and away from said hopper back portion so as to apply and release pressure upon said deck of cards therebetween; guide means located at the back portion of said hopper and extending in the direction of the length of said deck of cards; picker means mounted on said guide means for reciprocal motion therealong between first and second extreme positions, said picker means including a portion adapted for engagement with the other of said ends of the rearmost card only of said deck of cards, said first position being adjacent the mutual other of said ends of said deck of cards and said second position being intermediate said ends of said deck of cards and along said guide means a distance essentially equal to the length from said card exit to said means at the reading zone; first drive means for driving said picker means from said first to second positions and return; second drive means for driving said pressure plate from the rear toward the front of said hopper against a spring bias and to allow controlled return from the front to the rear of said hopper against said deck of cards by said spring bias; and means for coordinating the reciprocal actions of said pressure plate and picker means so that said deck of cards is under pressure during movement of said picker means from said first position to said second position.

12. Apparatus for feeding tabulating cards of oblong configuration including a short end corresponding to the width thereof and a long edge corresponding to the length thereof one at a time and short-endwise from a deck of such cards to means at a reading zone for accepting and drawing said cards in turn farther on, comprising a hopper adapted to receive and hold said deck of cards on a bottom portion thereof and between a back portion and a front portion thereof, said back portion comprising a planar surface essentially coextensive with said cards and including means defining a card exit adjacent an end of said back portion adapted to accommodate a first short end of the rearmost card in said deck of cards; a pressure plate located at said front portion of the hopper and essentially coextensive and coplanar with the frontmost card in said deck of cards for reciprocal motion toward and away from said hopper back portion so as to apply and release pressure upon said deck of cards therebetween; guide means located at the back portion of said hopper and extending in the direction of the length of said deck of cards; picker means mounted on said guide means for reciprocal motion therealong between first and second extreme positions, said picker means including a portion adapted for engagement with a second short end of the rearmost card only of said deck of cards, said first position being adjacent the mutual second short ends of said deck of cards and said second position being intermediate said first and second short ends of said deck of cards and along said guide means a distance essentially equal to the length from said card exit to said means at the reading zone; first drive means for driving said picker means from said second to said first positions against a spring bias and to allow controlled return from said first to second positions by said spring bias; second drive means for driving said pressure plate from the rear toward the front of said hopper against a spring bias and to allow controlled return from the front to the rear of said hopper against said deck of cards by said spring bias; and means for coordinating the reciprocal actions of said pressure plate and picker means so that said deck of cards is under pressure during movement of said picker means from said first position at least a major portion of the way toward said second position.

13. Apparatus according to claim 12 wherein said first drive means comprises a first cam, a first cam follower having means communicating with said picker means, and a first spring biasing said picker means toward said card exit; and wherein said second drive means comprises a second cam, a second cam follower having means communicating with said pressure plate, and a second spring biasing said pressure plate toward the back of said hopper.

14. Apparatus according to claim 13 wherein said coordinating means comprises a shaft carrying both said first and second cams in fixed angular relation to one another.

15. Apparatus according to claim 11 wherein said means defining a card exit comprises a slot in the said bottom of said hopper immediately adjacent the back portion thereof; and wherein said back portion further comprises means defining an aperture at the bottommost portion thereof, and a spring member protruding inwardly through said aperture so as to bear upon the adjacent rear face of the said rearmost card.

No references cited.

DARYL W. COOK, *Primary Examiner.*